United States Patent
Srinivasan

(10) Patent No.: US 12,160,624 B2
(45) Date of Patent: *Dec. 3, 2024

(54) REDUCING SIGNATURE MATCHING UNCERTAINTY IN MEDIA MONITORING SYSTEMS

(71) Applicant: The Nielsen Company (US), LLC, New York, NY (US)

(72) Inventor: Venugopal Srinivasan, Palm Harbor, FL (US)

(73) Assignee: The Nielsen Company (US), LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/967,390

(22) Filed: Oct. 17, 2022

(65) Prior Publication Data
US 2023/0114546 A1    Apr. 13, 2023

Related U.S. Application Data

(63) Continuation of application No. 17/181,830, filed on Feb. 22, 2021, now Pat. No. 11,477,501, which is a
(Continued)

(51) Int. Cl.
*H04N 21/24*     (2011.01)
*H04N 21/234*    (2011.01)
(Continued)

(52) U.S. Cl.
CPC ... *H04N 21/2407* (2013.01); *H04N 21/23418* (2013.01); *H04N 21/251* (2013.01); *H04N 21/8547* (2013.01)

(58) Field of Classification Search
CPC ......... H04N 21/2407; H04N 21/23418; H04N 21/251; H04N 21/8547
See application file for complete search history.

(56) References Cited

U.S. PATENT DOCUMENTS 4,450,631 A    5/1984  Gamble
4,677,466 A *  6/1987  Lert, Jr. .................. H04N 7/08
                                                    725/18
(Continued)

FOREIGN PATENT DOCUMENTS

CN    102217218    10/2011
EP    2362988     9/2011
(Continued)

OTHER PUBLICATIONS

Fink et al., "Social- and Interactive-Television Applications Based on Real-Time Ambient-Audio Identification," European Interactive TV Conference, 2006, 10 pages.
(Continued)

*Primary Examiner* — James R Sheleheda

(57) ABSTRACT

Methods, apparatus, systems and articles of manufacture to reduce signature matching uncertainty in media monitoring systems are disclosed. Disclosed example apparatus are to compare first groups of monitored signatures representative of monitored media with second groups of reference signatures representative of respective reference media to determine a first sequence of match results for an observation period, the first and second groups to have a first size corresponding to a first number of signatures. Disclosed example apparatus are also to compare, in response to a discontinuity in the first sequence of signature match results, third groups of monitored signatures from the sequence of monitored signatures with fourth groups of reference signatures from the respective sequences of reference signatures to determine a second sequence of signature match results for the observation period, the third groups and the fourth groups to have a second size greater than the first size.

18 Claims, 13 Drawing Sheets

Related U.S. Application Data continuation of application No. 16/417,140, filed on May 20, 2019, now Pat. No. 10,931,987, which is a continuation of application No. 15/894,671, filed on Feb. 12, 2018, now Pat. No. 10,321,171, which is a continuation of application No. 14/947,876, filed on Nov. 20, 2015, now Pat. No. 9,900,636.

(60) Provisional application No. 62/205,436, filed on Aug. 14, 2015.

(51) Int. Cl.
  *H04N 21/25* (2011.01)
  *H04N 21/8547* (2011.01)

(56) References Cited

U.S. PATENT DOCUMENTS

| | | | |
|---|---|---|---|
| 6,633,651 B1* | 10/2003 | Hirzalla | G06V 20/40 382/218 |
| 6,771,316 B1* | 8/2004 | Iggulden | H04N 21/4622 386/E5.043 |
| 7,661,121 B2* | 2/2010 | Smith | H04N 21/4314 725/135 |
| 8,181,196 B2 | 5/2012 | Falcon | |
| 8,739,198 B2 | 5/2014 | Falcon | |
| 8,805,560 B1 | 8/2014 | Tzanetakis et al. | |
| 8,805,683 B1 | 8/2014 | Wiseman et al. | |
| 9,055,179 B2 | 6/2015 | Bloom et al. | |
| 9,064,490 B2 | 6/2015 | Oh et al. | |
| 9,093,120 B2 | 7/2015 | Bilobrov | |
| 9,900,636 B2* | 2/2018 | Srinivasan | H04N 21/251 |
| 10,321,171 B2* | 6/2019 | Srinivasan | H04N 21/2407 |
| 10,931,987 B2* | 2/2021 | Srinivasan | H04N 21/8547 |
| 11,477,501 B2* | 10/2022 | Srinivasan | H04N 21/23418 |
| 2002/0133499 A1 | 9/2002 | Ward et al. | |
| 2003/0131350 A1 | 7/2003 | Peiffer et al. | |
| 2004/0189873 A1* | 9/2004 | Konig | H04N 21/2143 348/E7.06 |
| 2005/0149968 A1* | 7/2005 | Konig | H04N 21/25891 348/E7.06 |
| 2005/0267750 A1 | 12/2005 | Steuer et al. | |
| 2006/0184961 A1 | 8/2006 | Lee et al. | |
| 2006/0271947 A1* | 11/2006 | Lienhart | G06F 16/785 725/19 |
| 2007/0074147 A1 | 3/2007 | Wold | |
| 2007/0274537 A1 | 11/2007 | Srinivasan | |
| 2008/0229357 A1 | 9/2008 | Candelore et al. | |
| 2008/0239159 A1* | 10/2008 | Read | H04N 5/913 348/701 |
| 2008/0313140 A1* | 12/2008 | Pereira | G06V 20/48 |
| 2010/0115543 A1 | 5/2010 | Falcon | |
| 2010/0169908 A1* | 7/2010 | Nielsen | H04N 21/44222 725/14 |
| 2010/0246955 A1* | 9/2010 | Wright | G06V 20/40 382/173 |
| 2011/0022638 A1* | 1/2011 | Jiang | G06F 16/683 707/805 |
| 2011/0088053 A1* | 4/2011 | Lee | H04H 60/59 725/19 |
| 2011/0116719 A1* | 5/2011 | Bilobrov | G06V 20/40 382/217 |
| 2012/0117584 A1* | 5/2012 | Gordon | H04N 21/8358 725/19 |
| 2012/0291058 A1 | 11/2012 | Lee et al. | |
| 2013/0034337 A1* | 2/2013 | Hefeeda | H04N 5/913 386/E5.003 |
| 2013/0042262 A1* | 2/2013 | Riethmueller | H04N 21/25866 725/14 |
| 2013/0046399 A1 | 2/2013 | Lu et al. | |
| 2013/0054645 A1* | 2/2013 | Bhagavathy | G06V 20/46 707/E17.014 |
| 2014/0150001 A1 | 5/2014 | McMillan | |
| 2014/0236988 A1* | 8/2014 | Harron | G06F 16/783 707/769 |
| 2014/0259039 A1* | 9/2014 | Nielsen | H04N 21/44218 725/14 |
| 2014/0277640 A1 | 9/2014 | Bilobrov | |
| 2015/0199974 A1 | 7/2015 | Bilobrov, I et al. | |
| 2015/0373231 A1* | 12/2015 | Biswas | H04N 21/233 348/515 |
| 2017/0041684 A1* | 2/2017 | Krishnamurthy | H04N 21/233 |
| 2017/0150213 A1* | 5/2017 | Cremer | H04N 21/458 |
| 2017/0161304 A1* | 6/2017 | Diggins | G06V 20/46 |
| 2017/0171609 A1* | 6/2017 | Koh | H04N 21/251 |
| 2018/0167654 A1 | 6/2018 | Srinivasan | |
| 2019/0273958 A1 | 9/2019 | Srinivasan | |
| 2021/0176510 A1 | 6/2021 | Srinivasan | |
| 2023/0289383 A1* | 9/2023 | Harron | G06F 16/7328 |

FOREIGN PATENT DOCUMENTS

| | | |
|---|---|---|
| JP | 2005051716 | 2/2005 |
| JP | 2007020195 | 1/2007 |
| JP | 2008085767 | 4/2008 |
| JP | 2012507904 | 3/2012 |
| WO | 9959275 | 11/1999 |
| WO | 0161892 | 8/2001 |
| WO | 0211123 | 2/2002 |
| WO | 1418692 | 5/2004 |
| WO | 2005006768 | 1/2005 |
| WO | 2005011294 | 2/2005 |
| WO | 2005081829 | 9/2005 |
| WO | 2005116793 | 12/2005 |
| WO | 2006026736 | 3/2006 |
| WO | 2008042953 | 4/2008 |

OTHER PUBLICATIONS

United States Patent and Trademark Office, "Notice of Allowance," mailed in connection with U.S. Appl. No. 14/947,876, on Oct. 6, 2017, 8 pages.

United States Patent and Trademark Office, "Final Office Action," mailed in connection with U.S. Appl. No. 14/947,876, on Mar. 17, 2017, 17 pages.

United States Patent and Trademark Office, "Non-final Office Action," mailed in connection with U.S. Appl. No. 14/947,876, on Sep. 26, 2016 15 pages.

United States Patent and Trademark Office, "Notice of Allowance," mailed in connection with U.S. Appl. No. 15/894,671, on Jan. 24, 2019, 8 pages.

United States Patent and Trademark Office, "Non-final Office Action," mailed in connection with U.S. Appl. No. 15/894,671, on Jul. 24, 2018, 10 pages.

United States Patent and Trademark Office, "Notice of Allowance," mailed in connection with U.S. Appl. No. 16/417,140, on Oct. 19, 2020, 8 pages.

United States Patent and Trademark Office, "Non-final Office Action," mailed in connection with U.S. Appl. No. 16/417,140, on Jun. 10, 2020, 11 pages.

United States Patent and Trademark Office, "Notice of Allowance," mailed in connection with U.S. Appl. No. 17/181,830, on Jun. 10, 2022, 9 pages.

United States Patent and Trademark Office, "Final Office Action," mailed in connection with U.S. Appl. No. 17/181,830, on Jan. 25, 2022, 21 pages.

United States Patent and Trademark Office, "Non-Final Office Action," mailed in connection with U.S. Appl. No. 17/181,830, on Aug. 11, 2021, 17 pages.

* cited by examiner

700

```
QPKT:  906 SID: 4000 TS: 695037 GAP:  1 HAM:  44
QPKT:  907 SID: 4000 TS: 695039 GAP:  1 HAM:  42
QPKT:  908 SID: 4000 TS: 695041 GAP:  1 HAM:  43
QPKT:  909 SID: 4000 TS: 695043 GAP:  1 HAM:  55
QPKT:  910 SID: 4000 TS: 695045 GAP:  1 HAM:  52
QPKT:  911 SID: 4000 TS: 695047 GAP:  1 HAM:  48
QPKT:  912 SID: 4000 TS: 695049 GAP:  1 HAM:  40
QPKT:  913 SID: 4000 TS: 695051 GAP:  1 HAM:  42
NO MATCH QPKT:  914
NO MATCH QPKT:  915
QPKT:  916 SID: 4000 TS: 524680 GAP:  3 HAM:  17
QPKT:  917 SID: 4000 TS: 524682 GAP:  1 HAM:  25
QPKT:  918 SID: 4000 TS: 524684 GAP:  1 HAM:  33
QPKT:  919 SID: 4000 TS: 524686 GAP:  1 HAM:  28
QPKT:  920 SID: 4000 TS: 524688 GAP:  1 HAM:  27
QPKT:  921 SID: 4000 TS: 524690 GAP:  1 HAM:  33
QPKT:  922 SID: 4000 TS: 524692 GAP:  1 HAM:  24
QPKT:  923 SID: 4000 TS: 524694 GAP:  1 HAM:  21
QPKT:  924 SID: 4000 TS: 524696 GAP:  1 HAM:  21
QPKT:  925 SID: 4000 TS: 524699 GAP:  1 HAM:  24
QPKT:  926 SID: 4000 TS: 524701 GAP:  1 HAM:  29
QPKT:  927 SID: 4000 TS: 524703 GAP:  1 HAM:  26
QPKT:  928 SID: 4000 TS: 524705 GAP:  1 HAM:  20
QPKT:  929 SID: 4000 TS: 524707 GAP:  1 HAM:  30
QPKT:  930 SID: 3000 TS: 698624 GAP:  1 HAM:  27
QPKT:  931 SID: 3000 TS: 698626 GAP:  1 HAM:  15
QPKT:  932 SID: 3000 TS: 698628 GAP:  1 HAM:  18
QPKT:  933 SID: 3000 TS: 698630 GAP:  1 HAM:  27
QPKT:  934 SID: 3000 TS: 698632 GAP:  1 HAM:  22
QPKT:  935 SID: 3000 TS: 698635 GAP:  1 HAM:  16
QPKT:  936 SID: 3000 TS: 698637 GAP:  1 HAM:  19
QPKT:  937 SID: 3000 TS: 698639 GAP:  1 HAM:  23
QPKT:  938 SID: 3000 TS: 698641 GAP:  1 HAM:  26
QPKT:  939 SID: 3000 TS: 698643 GAP:  1 HAM:  24
QPKT:  940 SID: 3000 TS: 698645 GAP:  1 HAM:  22
QPKT:  941 SID: 3000 TS: 698647 GAP:  1 HAM:  16
QPKT:  942 SID: 3000 TS: 698649 GAP:  1 HAM:  18
QPKT:  943 SID: 3000 TS: 698651 GAP:  1 HAM:  33
QPKT:  944 SID: 3000 TS: 698653 GAP:  1 HAM:  42
QPKT:  945 SID: 4000 TS: 439512 GAP:  1 HAM:  17
QPKT:  946 SID: 4000 TS: 439514 GAP:  1 HAM:  36
QPKT:  947 SID: 5000 TS: 252836 GAP:  1 HAM:  30
QPKT:  948 SID: 5000 TS: 252838 GAP:  1 HAM:  56
QPKT:  949 SID: 4000 TS: 695125 GAP:  1 HAM:  33
QPKT:  950 SID: 4000 TS: 695127 GAP:  1 HAM:  48
QPKT:  951 SID: 4000 TS: 695129 GAP:  1 HAM:  46
QPKT:  952 SID: 4000 TS: 695131 GAP:  1 HAM:  55
QPKT:  953 SID: 4000 TS: 695133 GAP:  1 HAM:  50
```

```
QPKT:  906 SID: 4000 TS: 695010 GAP:   1 HAM:  386
QPKT:  907 SID: 4000 TS: 695012 GAP:   1 HAM:  372
QPKT:  908 SID: 4000 TS: 695014 GAP:   1 HAM:  358
QPKT:  909 SID: 4000 TS: 695016 GAP:   1 HAM:  350
QPKT:  910 SID: 4000 TS: 695018 GAP:   1 HAM:  352
QPKT:  911 SID: 4000 TS: 695020 GAP:   1 HAM:  367
QPKT:  912 SID: 4000 TS: 695022 GAP:   1 HAM:  374
QPKT:  913 SID: 4000 TS: 695025 GAP:   1 HAM:  368
QPKT:  914 SID: 4000 TS: 695026 GAP:   1 HAM:  378
QPKT:  915 SID: 4000 TS: 695029 GAP:   1 HAM:  394
QPKT:  916 SID: 4000 TS: 695031 GAP:   1 HAM:  405
QPKT:  917 SID: 4000 TS: 695033 GAP:   1 HAM:  408
QPKT:  918 SID: 4000 TS: 695035 GAP:   1 HAM:  401
QPKT:  919 SID: 4000 TS: 695037 GAP:   1 HAM:  408
QPKT:  920 SID: 4000 TS: 695039 GAP:   1 HAM:  410
QPKT:  921 SID: 4000 TS: 695041 GAP:   1 HAM:  419
QPKT:  922 SID: 4000 TS: 695043 GAP:   1 HAM:  407
QPKT:  923 SID: 4000 TS: 695045 GAP:   1 HAM:  397
QPKT:  924 SID: 4000 TS: 695047 GAP:   1 HAM:  404
QPKT:  925 SID: 4000 TS: 695049 GAP:   1 HAM:  424
QPKT:  926 SID: 4000 TS: 695051 GAP:   1 HAM:  412
QPKT:  927 SID: 4000 TS: 695053 GAP:   1 HAM:  405
QPKT:  928 SID: 4000 TS: 695055 GAP:   1 HAM:  411
QPKT:  929 SID: 4000 TS: 695057 GAP:   1 HAM:  402
QPKT:  930 SID: 4000 TS: 695059 GAP:   1 HAM:  393
QPKT:  931 SID: 4000 TS: 695061 GAP:   1 HAM:  371
QPKT:  932 SID: 4000 TS: 695063 GAP:   1 HAM:  361
QPKT:  933 SID: 4000 TS: 695066 GAP:   1 HAM:  350
QPKT:  934 SID: 4000 TS: 695067 GAP:   1 HAM:  358
QPKT:  935 SID: 4000 TS: 695070 GAP:   1 HAM:  351
QPKT:  936 SID: 4000 TS: 695072 GAP:   1 HAM:  345
QPKT:  937 SID: 4000 TS: 695074 GAP:   1 HAM:  346
QPKT:  938 SID: 4000 TS: 695076 GAP:   1 HAM:  349
QPKT:  939 SID: 4000 TS: 695078 GAP:   1 HAM:  355
QPKT:  940 SID: 4000 TS: 695080 GAP:   1 HAM:  343
QPKT:  941 SID: 4000 TS: 695082 GAP:   1 HAM:  339
QPKT:  942 SID: 4000 TS: 695084 GAP:   1 HAM:  355
QPKT:  943 SID: 4000 TS: 695086 GAP:   1 HAM:  346
QPKT:  944 SID: 4000 TS: 695088 GAP:   1 HAM:  342
QPKT:  945 SID: 4000 TS: 695090 GAP:   1 HAM:  351
QPKT:  946 SID: 4000 TS: 695092 GAP:   1 HAM:  353
QPKT:  947 SID: 4000 TS: 695094 GAP:   1 HAM:  350
QPKT:  948 SID: 4000 TS: 695096 GAP:   1 HAM:  366
QPKT:  949 SID: 4000 TS: 695098 GAP:   1 HAM:  369
QPKT:  950 SID: 4000 TS: 695100 GAP:   1 HAM:  372
QPKT:  951 SID: 4000 TS: 695102 GAP:   1 HAM:  361
QPKT:  952 SID: 4000 TS: 695104 GAP:   1 HAM:  379
QPKT:  953 SID: 4000 TS: 695106 GAP:   1 HAM:  393
```

FIG. 8

REDUCING SIGNATURE MATCHING UNCERTAINTY IN MEDIA MONITORING SYSTEMS

CROSS-REFERENCE TO RELATED APPLICATION(S)

This patent arises from a continuation of U.S. patent application Ser. No. 17/181,830 (now U.S. Pat. No. 11,477,501), which is titled "REDUCING SIGNATURE MATCHING UNCERTAINTY IN MEDIA MONITORING SYSTEMS," and which was filed on Feb. 22, 2021, which is a continuation of U.S. patent application Ser. No. 16/417,140 (now U.S. Pat. No. 10,931,987), which is titled "REDUCING SIGNATURE MATCHING UNCERTAINTY IN MEDIA MONITORING SYSTEMS," and which was filed on May 20, 2019, which is a continuation of U.S. patent application Ser. No. 15/894,671 (now U.S. Pat. No. 10,321,171), which is titled "REDUCING SIGNATURE MATCHING UNCERTAINTY IN MEDIA MONITORING SYSTEMS," and which was filed on Feb. 12, 2018, which is a continuation of U.S. patent application Ser. No. 14/947,876 (now U.S. Pat. No. 9,900,636), which is titled "REDUCING SIGNATURE MATCHING UNCERTAINTY IN MEDIA MONITORING SYSTEMS," and which was filed on Nov. 20, 2015, which claims the benefit of U.S. Provisional Application No. 62/205,436, which is titled "RESOLVING MULTIPLE MATCH CONDITIONS IN AUDIO FINGERPRINT ANALYSIS," and which was filed on Aug. 14, 2015. Priority to U.S. patent application Ser. Nos. 17/181,830, 16/417,140, U.S. patent application Ser. No. 15/894,671, U.S. patent application Ser. No. 14/947,876, and U.S. Provisional Application No. 62/205,436 is claimed. U.S. patent application Ser. No. 17/181,830, U.S. patent application Ser. No. 16/417,140, U.S. patent application Ser. No. 15/894,671, U.S. patent application Ser. No. 14/947,876, and U.S. Provisional Application No. 62/205,436 are hereby incorporated by reference in their respective entireties.

FIELD OF THE DISCLOSURE

This disclosure relates generally to media monitoring and, more particularly, to reducing signature matching uncertainty in media monitoring systems.

BACKGROUND

A media monitoring system typically includes one or more device meters to monitor the media presented by one or more media devices located at one or more monitored sites. In some example media monitoring systems, media signatures are collected by the device meters and used to identify and/or otherwise monitor the media presented by the one or more monitored media devices. Unlike media monitoring techniques based on codes and/or watermarks included with and/or embedded in the monitored media, signature-based media monitoring techniques generally use one or more inherent characteristics of the monitored media measured over a monitoring time interval to generate a substantially unique proxy to represent the media. Such a proxy is referred to as a media signature or media fingerprint, and can take any form (e.g., a series of digital values, a waveform, etc.) representative of any aspect(s) of the monitored media signal(s) (e.g., the audio and/or video signals forming the media presentation being monitored). A good media signature generation algorithm is typically one that generates repeatable signatures from the same media presentation, but generates unique signatures relative to other (e.g., different) presentations of other (e.g., different) media.

When signatures are used for media monitoring, signatures of the monitored media (referred to herein as monitored signatures) are generated by the device meter and compared to reference signatures representative of reference media known to the media monitoring system. When a match is found, the media corresponding to the monitored signatures being processed can be identified as corresponding to the reference media represented by the matching reference signatures. In many media monitoring systems, the device meters provide their generated site signatures to a data processing facility or other centralized processing site for comparison with the reference signatures that are representative of the reference media available for presentation at the respective monitored sites.

BRIEF DESCRIPTION OF THE DRAWINGS

FIG. 7 illustrates example matching results for a sequence of monitored signature packets using a first analysis window.

FIG. 8 illustrates example matching results for a sequence of monitored signature packets using a second analysis window that is larger than the first analysis window.

The figures are not to scale. Wherever possible, the same reference numbers will be used throughout the drawing(s) and accompanying written description to refer to the same or like parts, elements, etc.

DETAILED DESCRIPTION

Figure 1:
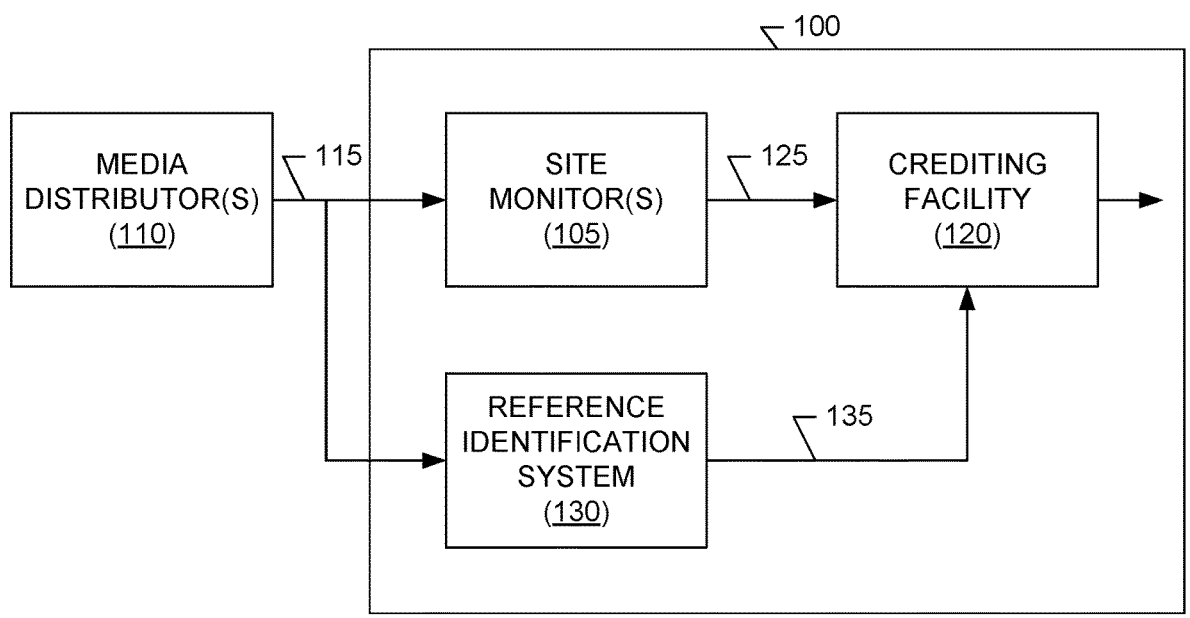
FIG. 1 is a block diagram of an example media monitoring system capable of reducing signature matching uncertainty in accordance with the teachings of this disclosure.

Methods, apparatus, systems and articles of manufacture (e.g., physical storage media) to reduce signature matching uncertainty in media monitoring systems are disclosed herein. Example media monitoring methods disclosed herein include executing a media signature matching procedure using a first analysis window on monitored media signatures representative of monitored media to identify the monitored media. Such disclosed example methods also include, in response to determining first matching results obtained from executing the media signature matching procedure using the first analysis window are indicative of a matching uncertainty condition, outputting second matching results obtained from executing the media signature matching procedure on the monitored media signatures using a second analysis window. In some such examples, the second analysis window is larger than the first analysis window. For example, the first analysis window may be substantially equal to four (4) seconds (or some other value), and the second analysis window may be substantially equal to thirty-two (32) seconds (or some other value).

Some disclosed example methods further include outputting the first matching results obtained from executing the media signature matching procedure using the first analysis window in response to determining the first matching results are not indicative of the matching uncertainty condition. For example, some such disclosed example methods include executing the media signature matching procedure using the first analysis window in parallel with executing the media signature matching procedure using the second analysis window. Some such disclosed example methods also include switching between outputting the first matching results obtained from executing the media signature matching procedure using the first analysis window and outputting the second matching results obtained from executing the media signature matching procedure using the second analysis window depending on whether the first matching results are indicative of the matching uncertainty condition.

Additionally or alternatively, some disclosed example methods further include examining, over a first observation period, reference timestamps associated with consecutive ones of the first matching results obtained from executing the media signature matching procedure using the first analysis window. Some such disclosed example methods also include determining the first matching results are indicative of the matching uncertainty condition when the reference timestamps are discontinuous in the first observation period. Some such disclosed example methods determine the reference timestamps are discontinuous in the first observation period when, over the first observation period, successive ones of the reference timestamps do not increment relative to preceding ones of the reference timestamps by a first amount within a range based on a time resolution associated with the first matching results.

Additionally or alternatively, in some disclosed examples, a first one of the first matching results is determined by comparing a first group of monitored signatures spanning a duration corresponding to the first analysis window to respective groups of reference signatures representative of respective different reference media sources to determine respective signature comparison values corresponding to the different reference media sources. Some such disclosed example methods further include determining the first matching results are indicative of the matching uncertainty condition when the first one of the first matching results indicates multiple reference media sources have respective signature comparison values that satisfy a comparison threshold.

These and other example methods, apparatus, systems and articles of manufacture (e.g., physical storage media) to reduce signature matching uncertainty in media monitoring systems are disclosed in further detail below.

As mentioned above, in media monitoring systems employing media signatures, monitored media signatures generated by device meters are compared to reference signatures representative of reference media known to the media monitoring system. When a match is found, the media corresponding to the monitored signatures being processed can be identified as corresponding to the reference media represented by the matching reference signatures. However, prior media monitoring systems can be prone to signature matching uncertainty when, for example, the same monitored media can be associated with multiple different reference sources.

For example, a given thirty (30) second commercial advertisement may be contracted to air on several different television channels at several different times of the day and/or on several different days of a given week. In such an example, the media monitoring system may consider the different possible televisions channels to be different possible reference media sources represented by respective sets of reference media signatures. However, because the media making up the commercial is the same for each possible airing of the commercial, the monitored media signatures obtained from a presentation of this commercial received by a monitored media device on a first one of these channels (e.g., corresponding to a first reference source) at a first time of day may match the respective reference media signatures representative of some or all of the other airings of this commercial at other times on this same channel (e.g., corresponding to the same first reference source), and/or at the same time and/or at other times on the other channels (corresponding to the other possible references sources). Prior media monitoring systems may be unable to resolve such signature matching uncertainty resulting from (1) multiple potential reference media sources having reference signatures capable of matching a given group of monitored media signatures and/or (2) the same reference media source having multiple different groupings of reference signatures capable of matching the given group of monitored media signatures.

Unlike such prior media monitoring systems, example media monitoring systems disclosed herein are able to resolve signature matching uncertainty resulting from (1) multiple potential reference media sources having reference signatures capable of matching a given group of monitored media signatures and/or (2) the same reference media source having multiple different groupings of reference signatures capable of matching the given group of monitored media signatures. More specifically, example media monitoring systems disclosed herein utilize multiple analysis windows to resolve such signature matching uncertainty. Prior media monitoring systems typically utilize one analysis window, which defines the size of the group, or neighborhood, of media signatures to be compared to determine whether monitored media matches a particular reference media source. Because media signatures are generated at successive signature generation time intervals (e.g., 16 millisecond intervals or some other value), the analysis window also defines the durations of the media segments which are compared to determine whether monitored media matches a particular reference media source. The analysis window utilized by such prior media monitoring systems is usually chosen to be short enough (e.g., 4 seconds or some other value) to ensure that the signatures included in the group, or neighborhood, of monitored media signatures defined by the analysis window belong to the same monitored media segment. However, if the same monitored media segment can be obtained from multiple, different reference media sources (such as in the example above), and/or at different times from the same reference media source, the group, or neighborhood, of monitored media signatures included in this short analysis window will likely match some or all of these different groups of reference signatures, thereby resulting in the signature matching uncertainty problem illustrated above.

Disclosed example media monitoring systems utilize multiple analysis windows to provide a technical solution to solve the technical problem of signature matching uncertainty. For example, and as disclosed in further detail below, media monitoring systems employing multiple analysis windows in accordance with the teachings of this disclosure can use a short analysis window (e.g., of 4 seconds or some other value) to compare monitored and reference signatures until a signature matching uncertainty condition is detected. Then, upon detecting the signature matching uncertainty condition, disclosed example media monitoring systems can switch to using a long analysis window (e.g., of 32 seconds or some other value) to resolve the signature matching uncertainty condition. In some examples, the long analysis window is chosen to have a duration longer than a media segment of interest (e.g., longer than a 30 second commercial), which causes the group, or neighborhood, of monitored media signatures included in the long analysis window to span multiple media segments (e.g., such as multiple commercials, or a commercial and a television program, etc.). In general, the combination of successive media segments available to a monitored media device at a given time-of-day and day-of-week will be unique to a given reference media source (e.g., corresponding to a given television channel on a given day and at a given time-of-day).

As such, using a long analysis window when signature matching uncertainty conditions are detected can help resolve such uncertainties, thereby allowing the unique reference media source corresponding to the monitored media to be accurately identified. However, when signature matching uncertainty conditions are not detected, disclosed example media monitoring systems can switch to utilizing a short analysis window, which supports finer signature matching granularity, thereby enabling channel surfing and similar media consumption behaviors to be monitored accurately. Examples techniques for reliably detecting signature matching uncertainty conditions are disclosed in further detail below.

Turning to the figures, a block diagram of an example media monitoring system 100 capable of reducing signature matching uncertainty in accordance with the teachings of this disclosure is illustrated in FIG. 1. The example media monitoring system 100 of FIG. 1 includes one or more example site monitor(s) 105 to monitor media presented at one or more monitored sites. In the illustrated example of FIG. 1, the media to be monitored is distributed by one or more example media distributor(s) 110. A media distributor 110 can correspond to any type of media distributor, such as a television station, a cable network, a satellite network (e.g., television or radio), a radio station, a streaming media service (e.g., such as Hulu™, Netflix®, etc.), etc. As such, the media distributed by the media distributor(s) 110 can correspond to any type of media, such as television programming, radio programming, multimedia (e.g., audio and/or visual) data, etc. In the illustrated example, the media distributor(s) 110 can distribute a particular piece/segment of media (e.g., such as a particular television program, a particular radio program, a particular movie, a particular commercial, etc.) to recipients (e.g., television viewers, radio listeners, computer users, electronic device users, etc.) via one or more example distribution media 115 (e.g., such a one or more radio frequency, cable and/or satellite television and/or radio channels, one or more networks carrying one or more digital transport channels, etc.).

Figure 2:
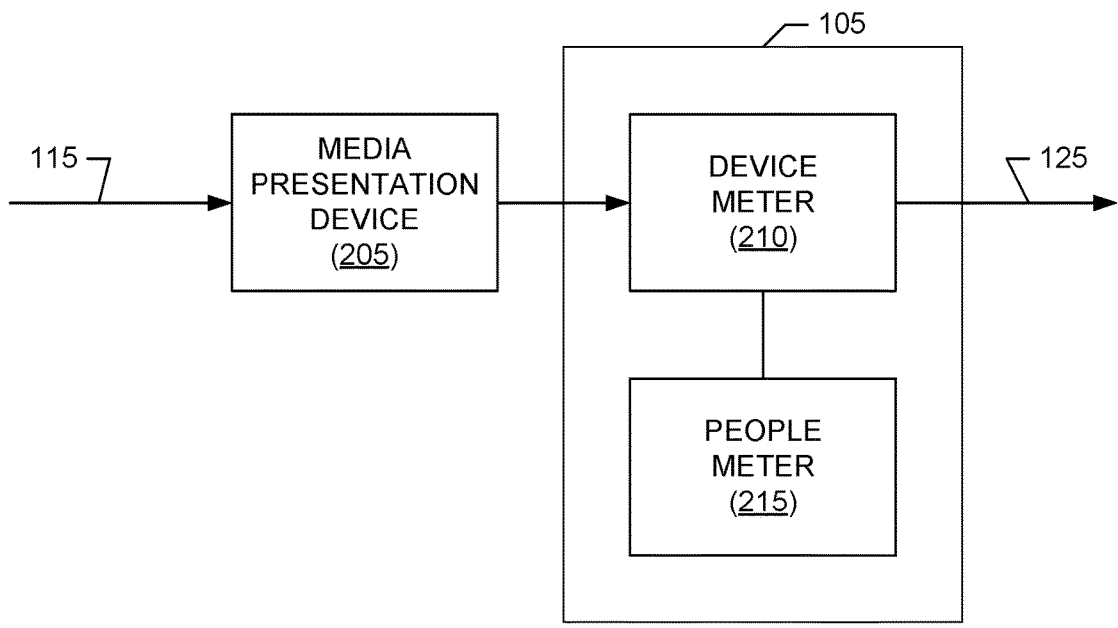
FIG. 2 is a block diagram of an example monitored site that may be monitored by an example site monitor included in the example media monitoring system of FIG. 1.

In the example media monitoring system 100 of FIG. 1, the media distributor(s) 110 distribute media via the distribution media 115 to one or more monitored sites, which are monitored by the example site monitor(s) 105. In some examples, the monitored sites correspond to one or more panelists selected (e.g., statistically) for inclusion in an audience measurement panel, media monitoring survey, etc. In some examples, each monitored site includes one or more media devices to present the media received at the monitored site from the media distributor(s) 110. In the illustrated example of FIG. 1, a given monitored site may be associated with one or more of the example site monitors 105. As discussed in further detail below, an example site monitor 105 for a given monitored site includes one or more device meter(s) to monitor the media presented by the media device(s) at the monitored site. For example, a device meter included in an example site monitor 105 can determine metering data, such as media signatures, that may be used to identify (and, thus, infer exposure to) media presented by a media device. In some examples, a site monitor 105 also includes a people meter to determine audience identification data (also referred to as demographic data, people meter data, etc.) identifying the audience members (e.g., panelists) being exposed to the monitored media, and/or in the vicinity of the monitored media device, etc. In such examples, the site monitor 105 for a given monitored site combines the metering data with the audience identification data to determine audience measurement data characterizing media exposure at the monitored site. The site monitor 105 can then store and report the metering data (or audience measurement data) to an example crediting facility 120 via an example reporting medium 125. In the illustrated example, the reporting medium 125 can be any type of data transmission medium, such as one or more data networks (e.g., such as the Internet), one or more mobile telephone (e.g., cellular) networks, a dial-up connection, etc. An example implementation of a site monitor 105 is illustrated in FIG. 2, which is described in greater detail below.

In the media monitoring system 100 of the illustrated example, the crediting facility 120 performs signature matching for media monitoring. Moreover, the example crediting facility 120 implements example techniques to reduce signature matching uncertainty in accordance with the teachings of this disclosure. Unlike media monitoring based on codes and/or watermarks included with and/or embedded in the monitored media, signature-based media monitoring generally uses one or more inherent characteristics of the monitored media during a signature sampling interval to generate a substantially unique proxy for the media. Such a proxy is referred to as a signature or media fingerprint, and can take the form of a series of bits, data values, a waveform, etc., representative of the media signal(s) (e.g., an audio signal and/or a video signal) forming the media presentation being monitored. A good signature is usually one that is repeatable when processing the same media presentation, but that is unique relative to other (different) presentations of other (different) media. Thus, as used herein, a signature is a representation of some characteristic of the media signal (e.g., a characteristic of the frequency spectrum of the signal) which can be used to identify the signal, and can be thought of as a fingerprint. Signatures are typically not dependent upon insertion of identification codes in the media, but instead preferably reflect an inherent characteristic of the media and/or the signal transporting the media. Systems to utilize codes and/or signatures for audience measurement are long known. See, for example, Thomas, U.S. Pat. No. 5,481,294, which is hereby incorporated by reference in its entirety.

In the example media monitoring system 100 of FIG. 1, signature-based media monitoring generally involves a site monitor 105 determining (e.g., generating) monitored signature(s) (also referred to as collected signature(s) or site signature(s)) representative of a media signal (e.g., an audio signal and/or a video signal) output by a media device monitored by the site meter 105. The site monitor 105 includes the monitored signature(s) in the metering data reported to the example crediting facility 120. The crediting facility 120 then compares the monitored signature(s) to one or more references signatures corresponding to known (e.g., reference) media. Various comparison criteria, such as a cross-correlation value, a Hamming distance, population (POP) count, etc., can be evaluated to determine whether a group, or neighborhood, of monitored signatures matches a particular group, or neighborhood, of reference signatures. When a match between the monitored signatures and the reference signatures is found, the monitored media represented by the monitored signatures can be identified as corresponding to the particular reference media represented by the reference signatures that matched the site signatures. Because attributes, such as an identifier of the media, a presentation time, a broadcast channel, etc., are collected and, thus, known for the reference media represented by the matching reference signatures, the crediting facility 120 may associate the monitored media with these same attributes of the matching reference media. The crediting facility 120 can then use the identified attributes of the monitored media to perform any appropriate post-processing to, for example, determine audience ratings information, identify targeted advertising to be provided to a site monitored by the site monitor 105 that reported the monitored signatures, etc.

The crediting facility 120 of the illustrated example also employs example techniques disclosed herein to resolve, or at least reduce, signature matching uncertainty resulting from (1) multiple potential reference media sources having reference signatures capable of matching a given group of monitored media signatures and/or (2) the same reference media source having multiple different groupings of reference signatures capable of matching the given group of monitored media signatures. As disclosed in further detail below, the example crediting facility 120 utilizes multiple analysis windows to resolve such signature matching uncertainty. In the example of FIG. 1, the crediting facility 120 defaults to using short analysis window (e.g., of 4 seconds or some other value) to define the groups, or neighborhoods, of monitored and reference signatures to be compared to identify a reference source that matches the monitored media. The crediting facility 120 of the illustrated example continues to use the short analysis window to compare monitored and reference signatures until a signature matching uncertainty condition is detected. Then, upon detecting the signature matching uncertainty condition, the crediting facility 120 of the illustrated example switches to using a long analysis window (e.g., of 32 seconds or some other value) to resolve the signature matching uncertainty condition.

In some examples, the long analysis window is chosen to have a duration longer than a media segment of interest (e.g., longer than a 30 second commercial), which causes the group, or neighborhood, of monitored media signatures included in the long analysis window to span multiple media segments (e.g., such as multiple commercials, or a commercial and a television program, etc.). In general, the combination of successive media segments available to a monitored media device at a given time-of-day and day-of-week will be unique to a given reference media source (e.g., corresponding to a given television channel on given day and at a given time-of-day). As such, the example crediting facility 120 uses the long analysis window when signature matching uncertainty conditions are detected to resolve, or at least reduce, such uncertainties, thereby allowing the unique reference media source corresponding to the monitored media to be accurately identified. However, when signature matching uncertainty conditions are not detected, the example crediting facility 120 can switch to utilizing the short analysis window, which supports finer signature matching granularity, thereby enabling channel surfing and similar media consumption behaviors to be accurately monitored. Operation of the crediting facility 120 to reduce signature matching uncertainty is described in further detail below in connection with the example implementations of the crediting facility 120 illustrated in FIGS. 5-9.

Figure 3:
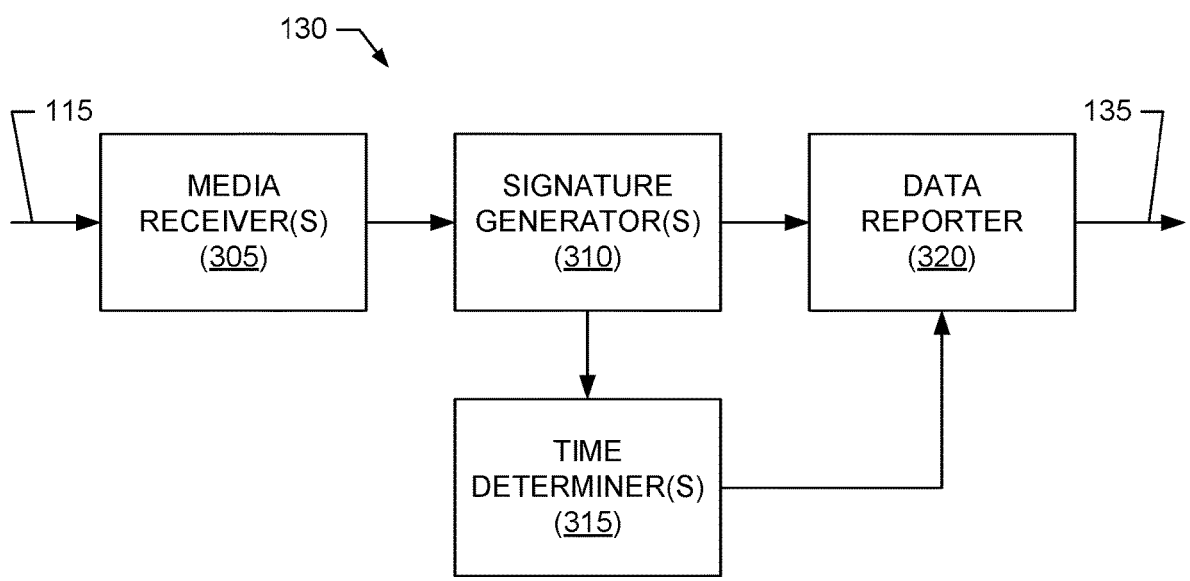
FIG. 3 is a block diagram of an example reference identification system that may be included in the example media monitoring system of FIG. 1.

The example media monitoring system 100 of FIG. 1 also includes an example reference identification system 130 to generate some or all of the reference signatures used by the example crediting facility 120. As described in further detail below, in some examples, the reference identification system 130 is located separately from the site monitor(s) 105 and monitors media distributions by some or all of the example media distributor(s) 110. The reference identification system 130 determines reference signatures from the media distributions, which correspond to the possible media that could be received at the monitored site(s) monitored by the example site monitor(s) 105. For example, for each media distribution monitored by the reference identification system 130, the reference identification system 130 generates respective reference signatures (e.g., sets/sequences of reference signatures representative of the different media distributions and associated with a signature monitoring interval), timestamps the reference signatures with time information (e.g., such as day and/or time-of-day information) corresponding to when the distributed media was received at the reference identification system 130, and associates media identification information with the reference signatures. The reference identification system 130 then stores and reports the timestamped reference signatures and media identification information to the crediting facility 120 via an example reporting medium 135. In the illustrated example, the reporting medium 135 can be any type of data transmission medium, such as one or more data networks (e.g., such as the Internet), one or more mobile telephone (e.g., cellular) networks, a dial-up connection, etc. An example implementation of the reference identification system 130 is illustrated in FIG. 3, which is described in greater detail below.

A block diagram of an example implementation of one of the site monitors 105 of FIG. 1 is illustrated in FIG. 2. The example site monitor 105 of FIG. 2 monitors an example media device 205 (also referred to herein as a media presentation device 205) that is to present media received at a monitored site via the distribution medium 115. The media device 205 can correspond to any type of media device, such as a set-top box, a television, a radio, a multimedia computer system, tablet computer, a portable digital assistant, a cellular/mobile smartphone, etc. In some examples, the media device 205 is capable of directly presenting media (e.g., via a display) while, in other examples, the media device 205 presents the media on separate media presentation equipment (e.g., speakers, a display, etc.). Thus, as used herein, media devices may or may not be able to present media without assistance from a second device.

The example site monitor 105 of FIG. 2 includes an example device meter 210, also referred to as a meter 210, a site meter 210, a site unit 210, a home unit 210, a media meter 210, etc., to monitor media presented by the media device 205. In the illustrated example, the media monitored by the device meter 210 can correspond to any type of media presentable by the media device 205. For example, monitored media can be media content, such a television programs, radio programs, movies, etc., and/or commercials, advertisements, etc. As such, the term "media" includes any type of content and/or advertisement delivered via any type of distribution medium. Thus, media includes television programming or advertisements, radio programming or advertisements, movies, web sites, streaming media, etc.

In the illustrated example, the device meter 210 determines metering data that may identify and/or be used to identify media presented by the media device 205, which may be used to thereby infer media exposure and/or consumption at the monitored site. The metering data determined by the example device meter 210 includes site signatures representative of the media presented by the media device 205. For example, in the site monitor 105 of FIG. 2, the device meter 210 may utilize invasive monitoring involving one or more physical connections to the media device 205, and/or non-invasive monitoring not involving any physical connection to the media device 205, to obtain access to one or more media signals corresponding to the media being presented by the media device 205. In some examples, the device meter 210 may process audio signals obtained from the media device 205 via a microphone and/or other audio sensor(s), and/or via a direct cable connection, to generate monitored audio signatures representative of the media being presented by the media device 205. Additionally or alternatively, the device meter 210 may process video signals obtained from the media device 205 via a camera and/or other video sensor(s), and/or a direct cable connection, to generate monitored video signatures (e.g., image signatures) representative of the media being presented by the media device 205. The monitored signatures generated by the device meter 210 at respective generation intervals can then be compared (e.g., at the example crediting facility 120) with known reference signatures to identify/monitor the media being presented by the media device 205.

In some examples, the site monitor 105 also includes an example people meter 215 to capture audience identification information describing an audience being exposed to the media presented by the media device 205. In some examples, the people meter 215 can prompt audience member(s) in the vicinity of the media device 205 to identify which one or more of a possible group of audience members are present in the audience. Additionally or alternatively, in some examples, the people meter 215 can automatically identify one or more individuals included in an audience in the vicinity of the media device 205. In such examples, the device meter 210 may combine the metering data (e.g., monitored signatures) identifying (e.g., directly or indirectly) the media being presented by the media device 205 with the audience identification data determined by the people meter 215 to form audience measurement data characterizing media exposure (e.g., with demographic information) at the site being monitored by the example site monitor 105.

Figure 4A:
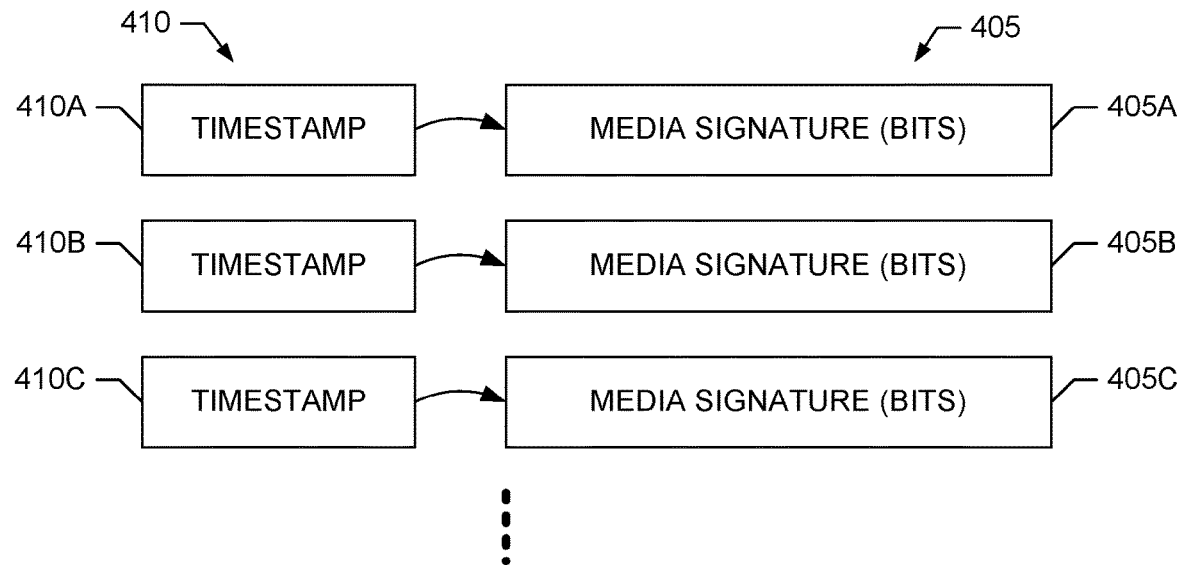
FIGS. 4A-B illustrate example media signatures that may be generated by the example site monitor(s) and the example reference identification system included in the example media monitoring system of FIG. 1.
Figure 4B:
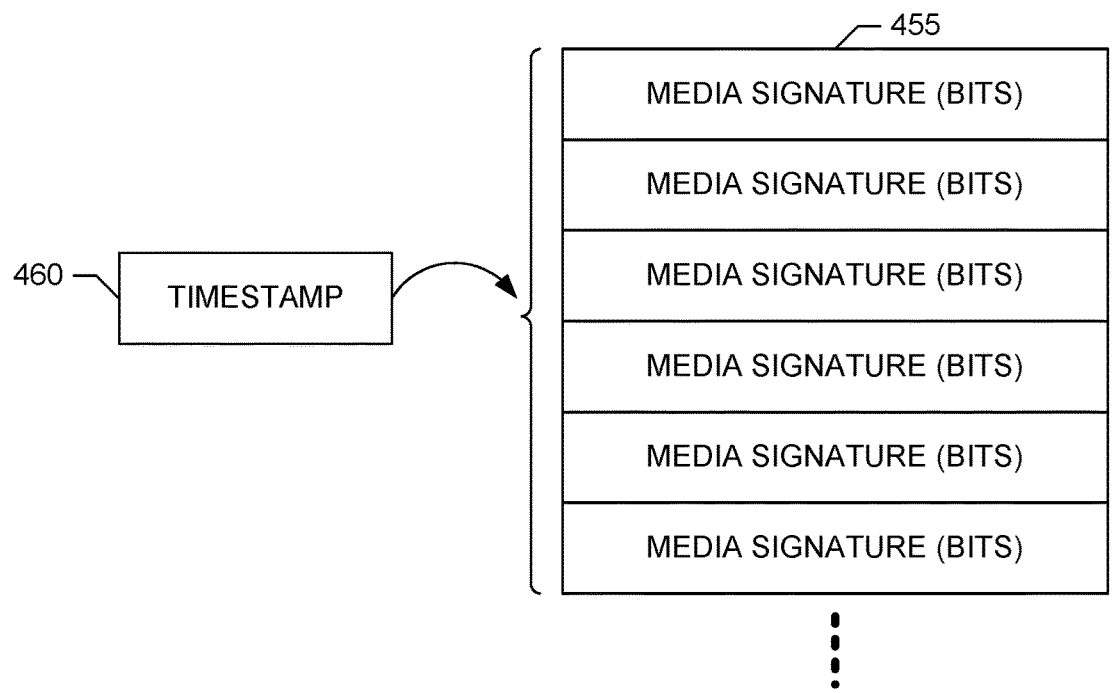

The device meter 210 of the illustrated example stores the metering data (or audience measurement data), including the monitored signatures, for reporting to the crediting facility 120 via the reporting medium 125. The monitored signatures reported in the metering data are also timestamped to allow the monitored signatures to be associated with the particular time(s) when the monitored signatures were generated. The timestamps also indicate the time(s) at which the monitored media represented by the monitored signatures was presented by the monitored media device 205. The device meter 210 can report the metering data/audience measurement data (including the monitored signatures and timestamps) as it is collected (e.g., streamed), at specified/predetermined time intervals, when a certain amount of data has been collected, when an available memory space is filled or reaches a threshold capacity (e.g., 90% or some other percentage being full), and/or via any other periodic, aperiodic and/or event-driven schedule. Example signatures that can be generated and reported by the example device meter 210 of FIG. 2 are illustrated in FIGS. 4A-B, which are described in further detail below.

A block diagram of an example implementation of the reference identification system 130 of FIG. 1 is illustrated in FIG. 3. As discussed above, the reference identification system 130 may be located separately from the site monitor(s) 105 and monitors one, some or all of the different media being distributed by the media distributor(s) 110 via the distribution media 115. In the illustrated example of FIG. 3, the reference identification system 130 includes one or more media receivers 305 to receive media being distributed by the media distributor(s) 110 via the distribution media 115. For example, the media receiver(s) 305 can include multiple receivers assigned to respective media distributors 110, such as particular television channels/networks, particular radio channels/networks, particular streaming services, etc. Additionally or alternatively, one or more of the media receiver(s) 305 can be shared (e.g., time-multiplexed) among multiple media distributors 110.

The example reference identification system 130 of FIG. 3 also includes one or more signature generators 310 to generate reference signatures representative of the media received by the media receiver(s) 305. For example, the signature generator(s) 310 can include audio signature generator(s) to generate audio signatures representative of the audio signal(s) corresponding to audio portion(s) of the media received by the media receiver(s) 305. Additionally or alternatively, the signature generator(s) 310 can include video signature generator(s) to generate video (e.g., image) signatures representative of the video signal(s) corresponding to video portion(s) of the media received by the media receiver(s) 305. As such, in some examples, the signature generator(s) 310 may implement signature generation technique(s) similar to those implemented by the device meter(s) 210 of the example site monitor(s) 105.

The signatures generated by the signature generator(s) 310 are reference signatures that can be used (e.g., by the example crediting facility 120) to identify corresponding media being distributed by the media distributor(s) 110. For example, for each media distribution received and processed by the reference identification system 130, the reference signatures output from the signature generator(s) are associated with media identification data (e.g., such as a source identifier, a stream identifier, etc.) identifying the particular media represented by the reference signatures. Such media identification data can be known to the reference identification system 130 based on, for example, the known association of the media receiver(s) 305 to the respective media distributor(s) 110.

The example reference identification system 130 of FIG. 3 further includes one or more time determiner(s) 315 to determine time information for association with the reference signatures determined by the signature generator(s) 310. For example, a signature generator 310 can trigger a time determiner 315 to determine time information (e.g., timestamps) indicating when reference signatures for a particular piece of media (e.g., media segment) were generated and, thus, when the corresponding reference media was received by the respective media receiver 305. The time information can include, for example, the particular day and/or time-of-day at which a particular reference signature or block of reference signatures was generated, which corresponds to the particular day and/or time-of-day at which the media represented by this reference signature or block of reference signatures was received by the reference identification system 130. In some examples, each signature generator 310 is associated with a respective time determiner 315. In some examples, groups of signature generators 310 are associated with a respective time determiner 315. The time determiner(s) 315 can include any timing source, such as a clock, timer, etc., capable of providing time information having an acceptable accuracy. Example reference signatures that can be generated and reported by the example reference identification system 130 of FIG. 3 are illustrated in FIGS. 4A-B, which are described in further detail below.

The illustrated example reference identification system 130 also includes an example data reporter 320 to report reference data to the crediting facility 120 via the example reporting medium 135. For example, the reference data reported by the example data reporter 320 can include reference signature blocks and associated timestamps and media identifiers generated by the signature generator(s) 310 and the time determiner(s) 315. The data reporter 320 can report the reference data (including the reference signature blocks, the associated timestamps and the media identifiers) as it is collected (e.g., streamed), at specified/predetermined time intervals, when a certain amount of data has been collected, when an available memory space is filled or reaches a threshold capacity (e.g., 90% or some other percentage being full), etc.

Example media signatures that can be generated and reported by the example site monitor 105 of FIGS. 1 and/or 2, and/or the example reference identification system 130 of FIGS. 1 and/or 3 are illustrated in FIGS. 4A-B. The illustrated example of FIG. 4A depicts media signatures 405A-C that can be generated (e.g., or otherwise collected) from media at successive signature generation intervals by the site monitor 105 and/or the reference identification system 130. The example media signatures 405A-C, collectively referred to as media signatures 405, are digital values represented by some number of bits. For example, each media signature 405A-C may be a digital value represented by 3 bytes, which corresponds to 24 bits. Of course, the media signatures 405A-C may be digital values represented by a different number of bits. As described above, the digital values making up the media signatures 405A-C may correspond to, for example, spectral-domain values, time-domain values and/or values of other characteristics generated from media signal(s) (e.g., audio signals, video signals, etc.) corresponding to the given media for which the media signatures 405A-C are generated.

In the illustrated example of FIG. 4A, the example media signatures 405A-C are associated with respective example timestamps 410A-C, collectively referred to as the timestamps 410. For example, the timestamps 410A-C can be day/time values indicating the times at which the respective media signatures 405A-C were generated. For example, the site monitor 105 and/or the reference identification system 130 may be configured to generate site signatures at a particular signature generation interval (e.g., approximately a 16 ms. interval, or at some other interval). In such examples, the timestamps 410A-C can have sufficient resolution to identify the particular signature generation interval at which a particular one of the media signatures 405A-C was generated. Furthermore, when the media signatures 405A-C correspond to media signatures generated by the reference identification system 130, the timestamps 410A-C indicate the original times at which the media corresponding to the media signatures 405A-C was provided (e.g., distributed, broadcast, etc.) by the respective media distributor 110. However, when the media signatures 405A-C correspond to media signatures generated by the site monitor 105, the timestamps 410A-C indicate the times at which the media corresponding to the media signatures 405A-C was presented by the monitored media device 205 (which may be the same or different from the original times at which the media was distributed by the respective media distributor 110 depending on, for example, whether the media undergoes time-shifting prior to being presented by the monitored media device 205).

Although each media signature 405A-C is associated with a respective timestamp 410A-C in the example of FIG. 4A, in other examples, such as in the example of FIG. 4B, multiple media signatures (e.g., a packet of media signatures, also referred to as a signature packet) may be associated with a single timestamp (e.g., which identifies the starting time at which the packet of media signatures was generated). The illustrated example of FIG. 4B depicts media signatures 455 that can be generated (e.g., or otherwise collected) from media at successive signature generation intervals by the site monitor 105 and/or the reference identification system 130. Like the example media signatures 405A-C, the example media signatures 455 are digital values represented by some number of bits. For example, each one of the media signatures 455 may be a digital value represented by 3 bytes, which corresponds to 24 bits. Of course, the media signatures 455 may be digital values represented by a different number of bits. As described above, the digital values making up the media signatures 455 may correspond to, for example, spectral-domain values, time-domain values and/or values of other characteristics generated from media signal(s) (e.g., audio signals, video signals, etc.) corresponding to the given media for which the media signatures 455 are generated.

In the illustrated example of FIG. 4B, the packet of media signatures 455 is associated collectively with an example timestamp 460. For example, the timestamp 460 can be a day/time value indicating the time at which the starting media signature (or some other media signature) in the packet of media signatures 455 was generated. In some examples, the timestamp 460 is structured to have sufficient resolution to identify the start time at which successive media signature packets were generated. For example, if the packet of media signatures 455 includes sixty-four (64) media signatures each generated at 16 ms. intervals, then the timestamp 460 may have a resolution of at least 1 second (or a fraction of a second) to permit accurate representation of the different times associated with different media signature packets.

In some examples, the site monitor(s) 105 may generate media signatures and timestamps in accordance with the example of FIG. 4A, whereas the reference identification system 130 may generate media signatures and timestamps in accordance with the example of FIG. 4B, or vice versa. In some examples, the example media signatures 405A-C and/or 455 are generated by the example site monitor(s) 105 and/or the example reference identification system 130 based on a spectral analysis of the audio stream of given media as follows. A block of audio consisting of 4096 samples is analyzed through use of a Discrete Fourier Transform. The resulting spectral frequency components, which include of real and imaginary parts, are convolved with a pair of complex functions to generate a pair of modified spectra $F_1(u)$ and $F_2(u)$, where $0 \leq u < 4096$ is the frequency index. The frequency index range is divided into 24 bands consisting of 32 consecutive indices starting at index 127. The energy associated with each band of frequencies in $F_1(u)$ is compared with a corresponding band in $F_2(u)$ to set a bit of the signature as a 1 or 0. With 24 such bands, a 24-bit signature that characterizes the block of 4096 samples can be computed. A sequence of such signatures is generated by sliding a window of length 4096 samples in increments of 128 samples to generate successive 24-bit integer signature. Thus, each 24-bit digital signature/fingerprint characterizing the audio is separated in time by 16 ms. (128 samples) from its neighbors in the sequence.

Figure 5:
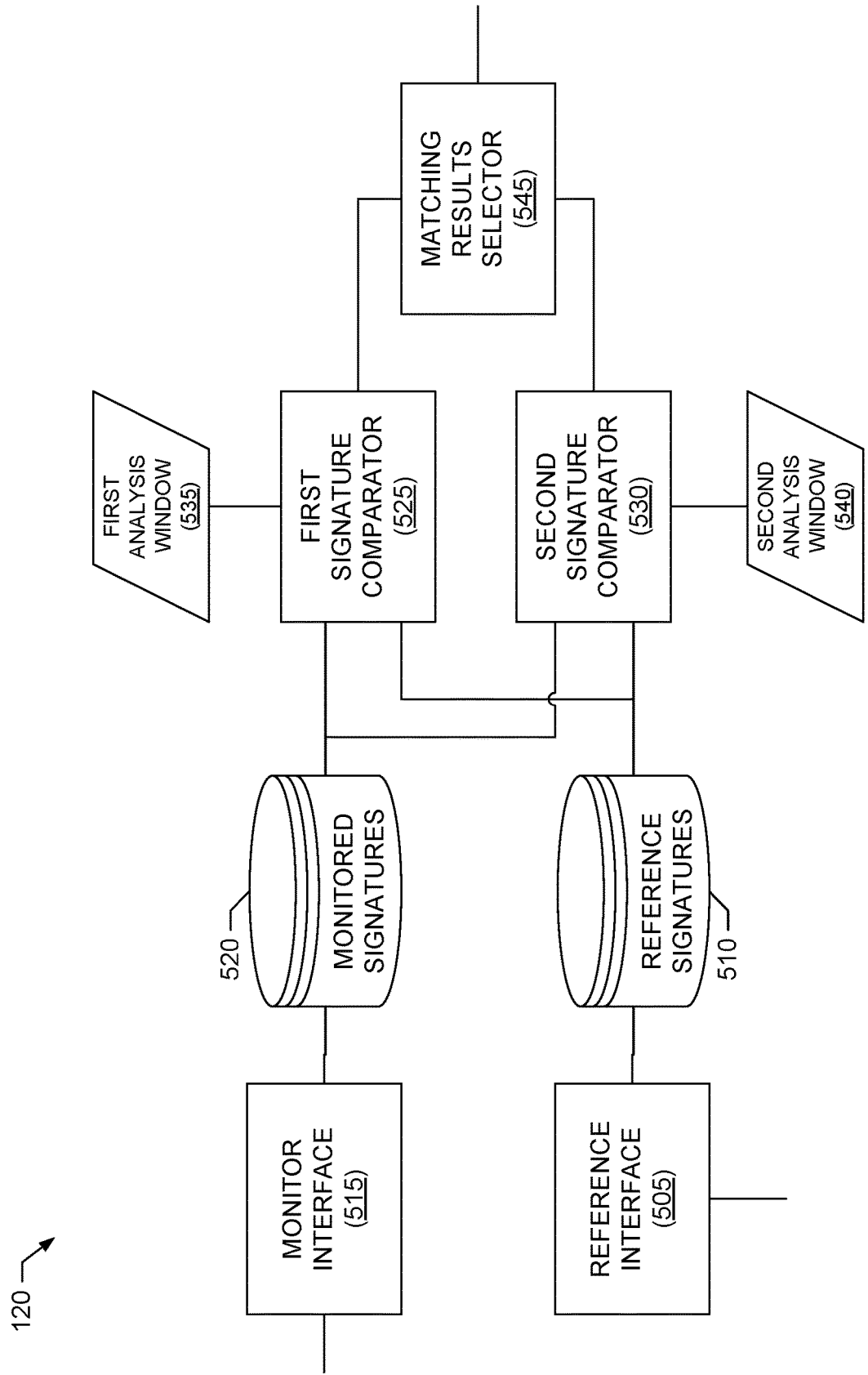
FIG. 5 is a block diagram of a first example implementation of an example crediting facility that may be included in the example media monitoring system of FIG. 1.

A block diagram of a first example implementation of the crediting facility 120 of FIG. 1 is illustrated in FIG. 5. The block diagram of FIG. 5 illustrates structures associated with implementing signature matching at the crediting facility 120. Other structures implemented by the crediting facility 120 have been omitted for clarity.

Turning to FIG. 5, the illustrated example crediting facility 120 includes an example reference interface 505 to interface with a reference identification system, such as the example reference identification system 130 of FIGS. 1 and/or 3. As such, the reference interface 505 can be implemented using any interface technology, communication device(s), etc., capable of interfacing with and receiving data via the example reporting medium 135. The example reference interface 505 receives reference data from the reference identification system 130, including reference signatures and associated timestamps representative of different reference media sources received by the reference identification system 130 (e.g., corresponding to the different media distributor(s) 110).

The example crediting facility 120 of FIG. 5 also includes an example reference signature storage 510 to store the respective sequences of reference signatures and associated reference timestamps received via the reference interface 505 for different reference media sources. The example reference signature storage 510 may be implemented by any number(s) and/or type(s) of volatile and/or non-volatile memory, storage, etc., or combination(s) thereof, such as the example volatile memory 1314 and/or the example mass storage device(s) 1328 included in the example processing system 1300 of FIG. 13, which is described in further detail below.

The example crediting facility 120 of FIG. 5 further includes an example monitor interface 515 to interface with one or more site monitors, such as the example site monitor(s) 105 of FIGS. 1 and/or 2. As such, the monitor interface 515 can be implemented using any interface technology, communication device(s), etc., capable of interfacing with and receiving data via the example reporting medium 125. The example monitor interface 515 receives metering data from the site monitor(s) 105, including monitored signatures and associated timestamps representative of media presented by media device(s) monitored by the site monitor(s) 105.

The example crediting facility 120 of FIG. 5 also includes an example monitored signature storage 520 to store the respective sequences of monitored signatures and associated reference timestamps received via the monitor interface 515 from ones of the site monitor(s). The example monitored signature storage 520 may be implemented by any number(s) and/or type(s) of volatile and/or non-volatile memory, storage, etc., or combination(s) thereof, such as the example volatile memory 1314 and/or the example mass storage device(s) 1328 included in the example processing system 1300 of FIG. 13, which is described in further detail below. In some examples, the monitored signature storage 520 and the reference signature storage 510 may be implemented by separate storage elements, whereas in other examples, the monitored signature storage 520 and the reference signature storage 510 may be implemented by the same storage element.

In the illustrated example of FIG. 5, the example crediting facility 120 includes two example media signature comparators 525 and 530 to perform signature matching for media monitoring. The example signature comparators 525 and 530 perform respective media signature matching procedures to compare a sequence of monitored signatures from the monitored signature storage 520 with different sequences of reference signatures from the reference signature storage 510, which are representative of different possible reference media sources. For example, such signature matching procedures may evaluate one or more comparison criteria, such as a cross-correlation value, a Hamming distance, population (POP) count, etc., to determine whether a group, or neighborhood, of monitored signatures matches a particular group, or neighborhood, of reference signatures representative of a particular reference media source. In the illustrated example of FIG. 5, the first example signature comparator 525 is configured to perform such a media signature matching procedure using a first example analysis window 535, and the second example signature comparator 530 is configured to perform a same or different media signature matching procedure using a second example analysis window 540. In the illustrated example, the second example analysis window 540 is larger than the first example analysis window 535. Furthermore, in the illustrated example of FIG. 5, the two example signature comparators 525 and 530 operate in parallel to produce respective signature matching results associated with the different analysis windows 535 and 540.

The different analysis windows 535 and 540 define the sizes of the groups, or neighborhoods, of monitored and reference media signatures that are compared by the respective signature comparators 525 and 530 to determine whether monitored media represented by the monitored media signatures matches the particular reference media source represented by a given group of reference media signatures. For example, consider an example television program having a duration of sixty (60) minutes. To represent this television program with media signatures (e.g., audio signatures) generated at 16 ms intervals in accordance with the examples described, the reference identification system 130 would generate a sequence of 225,000 reference signatures, with each signature being a 24-bit integer, which would be stored in the reference signature storage 510. An example site monitor 105 monitoring a media device presenting this same television program as provided by one of the media distributors 110 would generate a similar sequence of 24-bit monitored audio signatures, which would be stored in the monitored signature storage 520. In general, the sequence of monitored media signatures generated by the site monitor 105 will differ from the sequence of reference signatures generated by the reference identification system 130 for this same television program because, for example, the signature generation intervals for the two different sequences may not be time-aligned, the media signal (e.g., audio signal) processed by the site monitor 105 may be sensed non-invasively (e.g., with a microphone) and, thus, may be subjected to more ambient noise than the media signal (e.g., audio signal) processed by the reference identification system 130, etc. Nevertheless, the signature comparison algorithm(s) implemented by the signature comparators 525 and 530 will likely be able to detect one or more of the monitored signatures that match a respective one or more of the reference signatures for this television program.

In the illustrated example of FIG. 5, when the example signature comparator 525 finds such a match, the signature comparator 525 further examines a neighborhood of monitored and reference signatures surrounding the match location (e.g., the time associated with the matching signatures) to determine an overall signature matching result between the monitored and reference signatures sequences for that match location. In the illustrated example of FIG. 5, the first analysis window 535 defines the size of the neighborhoods of monitored and reference signatures to be compared by the signature comparator 525 to determine whether the monitored media matches a particular reference media source. In some examples, the first analysis window 535 is a specified to be a four (4) second analysis window, which causes the signature comparator 525 to process neighborhoods of monitored and reference signatures including 256 signatures, respectively (e.g., because 256 signatures spaced at 16 ms. intervals cover a time span on 256×0.016=4.096 seconds). However, in some examples, because consecutive media signatures may not exhibit substantial bit changes, the signature comparator 525 may reduce its processing load by choosing every $8^{th}$ (or some other number) media signature in the respective monitored and reference signature sequences to construct neighborhoods of 32 signatures for comparison. The spacing between each of these 32 signatures is 8×16=128 ms, and the total time span of the 32 signatures is again approximately 4 seconds, corresponding to the first analysis window 535.

In some examples, the signature matching procedure implemented by the signature comparator 525 includes calculating a Hamming distance between the 24×32=768 bits constituting the 32 signatures in the reference and monitored signature neighborhoods defined by the first analysis window 535, which is specified to be 4 seconds in the foregoing example. In some such examples, the signature comparator 525 employs a comparison threshold to improve the reliability of the outputted match results. For example, in the preceding example, the signature comparator 525 may utilize a threshold of 200, which specifies that, for the signature comparator 525 to determine that the neighborhood of monitored signatures matches the neighborhood of reference signatures, the Hamming distance between the two neighborhoods must be less than (or less than or equal to) 200, which means that no more than 200 of the 768 bits can differ between the two neighborhoods. Of course, other threshold values could be used.

As noted above, a technical problem faced by prior media monitoring systems employing media signatures is the signature matching uncertainty resulting from (1) multiple potential reference media sources having reference signatures capable of matching a given group of monitored media signatures and/or (2) the same reference media source having multiple different groupings of reference signatures capable of matching the given group of monitored media signatures. For example, such matching uncertainty can occur when multiple instances of the same media (e.g., the same television program, the same commercial, etc.) are broadcast at different times and/or on different television channels. In some examples of television audience measurement, program viewing is credited for up to eight (8) days after the original air date. If a monitored site (e.g., corresponding to a panelist) household has access to, for example, 100 channels, represented as CH1, CH2, . . . , CH100, a reference media signature database covering an 8 day period for all the 100 channels may be maintained in the example reference signature storage 510. Consider an example in which, in the particular market where this household is located, a national 30-second commercial spot, referred to as AD1, is contracted to air on channels CH4, CH5 and CH7, and at multiple times during the day. Further, assume a television set or other media device at this monitored site was tuned to a channel, say CH4, at 8:08 p.m., and the commercial spot AD1 was received. Prior media monitoring system employing signature matching using an analysis window of 4 seconds may yield multiple successful matches corresponding to the airing of this commercial spot on CH4, CH5, and CH7 and at multiple time instants on different days. This is because, within the 4 second window, the reference media signatures for these different airings will be substantially the same. Similar behavior may also be observed with the signature comparator 525 when it is configured with the first analysis window 535 having a value of 4 seconds.

For example, the signature comparator 525 may implement a signature matching procedure that determines that the reference media signature neighborhood yielding the smallest Hamming distance is the match to a given monitored media sequence neighborhood. The 4 second neighborhood specified by the first analysis window 535 may result in multiple different possible reference sources of AD1 (e.g., corresponding to the different channels CH4, CH5 and CH7, and at multiple times during the day) having the same, or similar, sequences of reference signatures within this neighborhood. Furthermore, due to noise, degradation, etc., associated with the microphone captured audio from which the monitored signatures are derived, the signature comparator 525 might report the reference source corresponding to AD1 being broadcast on CH5 at 7:21 p.m. as having the lowest Hamming distance. This would be incorrect in this example because the monitored media device presented the instance of AD1 broadcast on CH4, at 8:08 p.m. Accurate crediting of the viewing using the signature comparator 525 configured with the first analysis window 535 having a value of 4 seconds becomes difficult in this example because the signature comparator 525 used the 4 second analysis window described above to compute the Hamming distance, which yielded multiple potential matching reference neighborhoods.

The example crediting facility 120 of FIG. 5 includes the second example signature comparator 530 configured by the second example analysis window 540 to resolve, or at least reduce, such signature matching uncertainty resulting from (1) multiple potential reference media sources having reference signatures capable of matching a given group of monitored media signatures and/or (2) the same reference media source having multiple different groupings of reference signatures capable of matching the given group of monitored media signatures. As described above, the second example signature comparator 530 is configured to perform a signature matching procedure, which may be the same or different from the signature matching procedure performed by the first example signature comparator 525, but using the second example analysis window 540, which is larger than the first example analysis window 535.

For example, the second example analysis window 540 may be specified to be thirty-two (32) seconds, or some other value, that is larger than the media segments of interest, such as 30 second commercials in the preceding example. Such a larger second example analysis window 540 spans multiple media segments of interest (e.g., such as multiple commercials broadcast on a given channel, or a commercial and a television program broadcast on a given channel, etc.). The particular combination of successive media segments available to a monitored media device from a given reference media source on a given day and at a given time-of-day is likely to be unique (e.g., such as when the different possible reference media sources correspond to different possible television channels). Accordingly, the larger neighborhood of media signatures defined by the second example analysis window 540 is also likely to be unique to a given reference media source. Thus, the second example signature comparator 530, which performs its signature matching procedure using the second example analysis window 540, is able to resolve or reduce the foregoing signature matching uncertainty because the larger neighborhoods of monitored and reference signatures defined by the second example analysis window 540 represent combinations of successive media segments that are likely to be unique to a given possible reference media source.

In some examples, the second example signature comparator 530 also uses a comparison threshold to improve the reliability of the outputted match results. However, the comparison threshold used by the second example signature comparator 530 may be larger than the comparison threshold used by the first example signature comparator 525 due to the larger analysis window configured for the signature comparator 530. For example, if the signature matching procedure implemented by the signature comparator 530 includes calculating a Hamming distance, the Hamming distance will be between the 24×256=6144 bits constituting the 256 signatures in the reference and monitored signature neighborhoods defined by the second analysis window 540, which is specified to be 32 seconds in the foregoing example. (Taking every 8 signature of signatures spaced 16 ms apart over a 32 second window yields 256 signatures.) In some such examples, the signature comparator 530 may utilize a threshold of 1600, which specifies that, for the signature comparator 530 to determine that the neighborhood of monitored signatures matches the neighborhood of reference signatures, the Hamming distance between the two neighborhoods must be less than (or less than or equal to) 1600, which means that no more than 1600 of the 6144 bits can differ between the two neighborhoods. Of course, other threshold values could be used.

Figure 6:
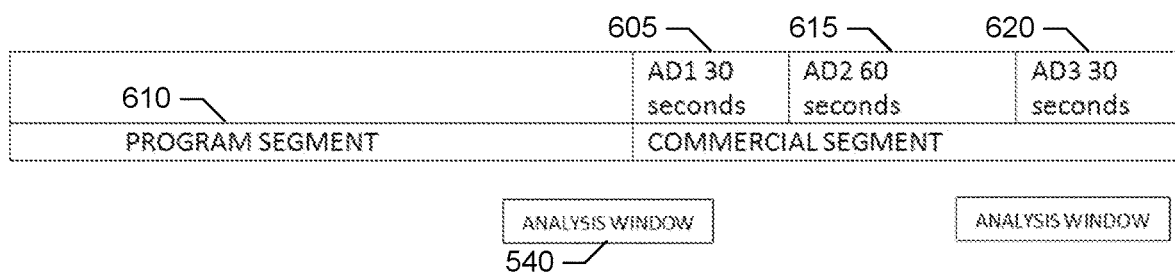
FIG. 6 illustrate example an example analysis window capable of being used by the example crediting facilities of FIGS. 1, 5 and/or FIG. 9 to reduce signature matching uncertainty in accordance with the teachings of this disclosure.

FIG. 6 illustrates an example version of the second example analysis window 540. As depicted in the example of FIG. 6, the second example analysis window 540 is specified to be large enough to encompass, in general, a combination of an example commercial segment 605 and a portion of an example program content segment 610, or a combination of two successive example commercial segments 615 and 620. These combinations of successive media segments will likely be unique to the particular reference media source (e.g., particular media distributor 110) providing the illustrated sequence of media segments 605-620. Accordingly, the resulting sequences of monitored and reference media signatures representing this particular sequence of media segments 605-620 are also likely to be unique, thereby reducing, or resolving, the signature matching uncertainty that can arise when each such media segment is analyzed in isolation.

First example signature matching results 700 output from the first example signature comparator 525 using the first example analysis window 535 set to 4 seconds is illustrated in FIG. 7. Second example signature matching results 800 output from the second example signature comparator 530 using the second example analysis window 540 set to 32 seconds is illustrated in FIG. 8. The example signature matching results illustrated in FIGS. 7 and 8 further demonstrate the potential benefits of using the larger analysis window 540 for signature matching. In the illustrated examples of FIGS. 7 and 8, each row of signature matching results 700 and 800 represent the signature matching results returned by the respective signature comparators 525 and 530 for successive monitored signature packets retrieved from the monitored signature storage 520. In the illustrated examples, each monitored signature packet (labeled as QPKT) has a numeric identifier and corresponds to a sequence of signatures representing a media duration of approximately 2 seconds. As such, the example signature matching results 700 and 800 have a time resolution of approximately 2 seconds, with each matching result identifying the particular reference source determined to match the corresponding monitored signature packet. In the example matching results 700 and 800, the matching reference source is identified by a source identifier (SID) and a reference timestamp (TS) corresponding to the time when the matching reference media was received by the reference identification system 130. The example matching results 700 and 800 also list the Hamming distance (HAM) between the monitored signatures and the reference signatures for the reference source identified as the best match, and a GAP indicator to indicate the gap with respect to the previous successful match.

The example matching results 700 of FIG. 7 illustrate the signature matching uncertainty problem associated with the smaller 4 second analysis window 535. Because each of the monitored signature packets includes signatures covering a 2-second interval, the 4 second analysis window 535 causes two (2) adjacent monitored signature packets to be included in the neighborhood of monitored signatures used to generate each one of the example matching results 700 corresponding to a respective one of the input monitored signature packets. In the illustrated example of FIG. 7, the actual reference media source corresponding to the monitored media signatures was a television channel corresponding to SID 4000. However, because the matching results 700 are determined with the smaller 4 second analysis window 535, some of the neighborhoods of monitored signature packets instead matched broadcasts of the same media on television channels corresponding to SIDs 3000 and 5000 (see e.g., the example results 700 for QPKTs 930-944 and 947-948), but at different times as indicated by the discontinuities in the sequence of reference timestamps for the example results identifying SIDs 3000 and 5000. Such reference timestamp discontinuities can be an indication of signature matching uncertainty, as discussed in further detail below. Furthermore, the example matching results 700 include instances in which no match satisfying the matching threshold was found (see e.g. the example results 700 for QPKTs 914-915).

In contrast, the example matching results 800 of FIG. 8 illustrate the ability of the larger 32 second analysis 540 to resolve the signature matching uncertainty associated with the smaller 4 second analysis window 535. Because each of the monitored signature packets includes signatures covering a 2-second interval, the 32 second analysis window 540 causes sixteen (16) adjacent monitored signature packets to be included in the neighborhood of monitored signatures used to generate each one of the example matching results 700 corresponding to a respective one of the input monitored signature packets. In the illustrated example of FIG. 8, the actual reference media source corresponding to the monitored media signatures was also the television channel corresponding to SID 4000. Because the matching results 800 are determined with the larger 32 second analysis window 540, the matching results were not susceptible to instances where brief media segments were available from multiple different reference sources (e.g., SIDs the television channels corresponding to SIDs 3000 and 5000). Instead, with the larger 32 second analysis window 540), the matching results 800 consistently identify SID 4000 as the source of the monitored media, and the matching reference timestamps consistently increment at the proper time resolution of approximately 2 seconds. Also, as expected, the Hamming distance values for the example matching results 800 are larger than the Hamming distance values for the example matching results 700 due to the matching results 800 being determined for larger neighborhoods of signatures (e.g., by approximately a factor of 8 due to the second analysis window 540 being 8 times larger than the first analysis window 535).

Returning to FIG. 5, in the illustrated example, the example signature comparators 525 and 530 included in the example crediting facility 120 operate in parallel to determine their respective signature matching results based on the different respective analysis windows 535 and 540. In the illustrated example of FIG. 5, the example crediting facility 120 further includes an example matching results selector 545 to select whether the example crediting facility 120 is to output the first signature matching results from the first example signature comparator 525 or the second signature matching results from the second example signature comparator 530. In some examples, the matching results selector 545 evaluates the first signature matching results output from the first example signature comparator 525 to determine whether those first signature matching results are indicative of a matching uncertainty condition. In some such examples, the matching results selector 545 selects to output the second signature matching results from the second example signature comparator 530 in response to determining the first signature matching results are indicative of a matching uncertainty condition. However, in some such examples, the matching results selector 545 selects to output the first signature matching results from the first example signature comparator 525 instead in response to determining the first signature matching results are not indicative of a matching uncertainty condition.

Such an example matching results selector 545 allows the example crediting facility 120 of FIG. 5 to use a long analysis window when a signature matching uncertainty conditions is detected, which can help resolve such uncertainties, thereby allowing the unique reference media source corresponding to the monitored media to be accurately identified. However, when signature matching uncertainty conditions are not detected, disclosed example media monitoring systems can switch to utilizing a short analysis window, which supports finer signature matching granularity, thereby enabling channel surfing and similar media consumption behaviors to be accurately monitored.

In some examples, the matching results selector 545 determines whether the first signature matching results output from the first example signature comparator 525 are indicative of a matching uncertainty condition by examining the matching results over an observation period to detect inconsistencies in the results. For example, for typical media exposure scenarios, one would expect the media signature matching results over a moderate observation period of, say, one or a few minutes to correspond to the same reference media source (or just a few reference media sources), and with reference timestamps that increment continuously over the observation period by amounts within a range based on a time resolution associated with the matching results (e.g., such as within a range of 1 to 3 seconds for a time resolution of 2 seconds exhibited by the example results 700 and 800 of FIGS. 7 and 8). Thus, in some examples, the matching results selector 545 may determine whether successive matching results from the first example signature comparator 525, which uses the shorter (e.g., 4 second) analysis window 535, are associated with different (e.g., changing) reference media sources and/or discontinuous timestamps within a given observation time period, which indicates the shorter window 535 is causing the first example signature comparator 525 to oscillate among multiple potential matching reference sources. For example, the matching results selector 545 may determine the matching reference timestamps are discontinuous in the observation period when, over the observation period, successive ones of the reference timestamps do not increment relative to preceding ones of the reference timestamps by a first amount within a range (e.g., 1 to 3 seconds) based on a time resolution (e.g., 2 seconds) associated with the matching results output by the first example signature comparator 525. If such behavior is detected, the matching results selector 545 selectively switches to outputting the matching results from the second example signature comparator 530, which uses the longer (e.g., 32 second) analysis window 540.

Additionally or alternatively, in some examples, the matching results selector 545 examines the matching results from the first example signature comparator 525, which uses the shorter (e.g., 4 second) analysis window 535, to determine whether, for a given signature matching result (e.g., corresponding to a given monitored signature packet), multiple possible reference sources yield respective intermediate matching results satisfying a comparison threshold (e.g., have associated Hamming distances that are less than or equal to a threshold value). Such behavior is also indicative of the shorter analysis window 535 causing the first example signature comparator 525 to oscillate among multiple potential matching reference sources. Accordingly, if such behavior is detected, the matching results selector 545 selectively switches to outputting the matching results from the second example signature comparator 530, which uses the longer (e.g., 32 second) analysis window 540.

In some examples, the matching results selector 545 continues to cause the example crediting facility 120 of FIG. 5 to output the matching results from the second example signature comparator 530, which uses the longer (e.g., 32 second) analysis window 540, until the matching results from the first example signature comparator 525, which uses the shorter (e.g., 4 second) analysis window 535, no longer exhibit the foregoing behavior indicative of signature matching uncertainty. When that occurs, the matching results selector 545 selectively switches to outputting the matching results from the first example signature comparator 525, which uses the shorter (e.g., 4 second) analysis window 535.

Figure 9:
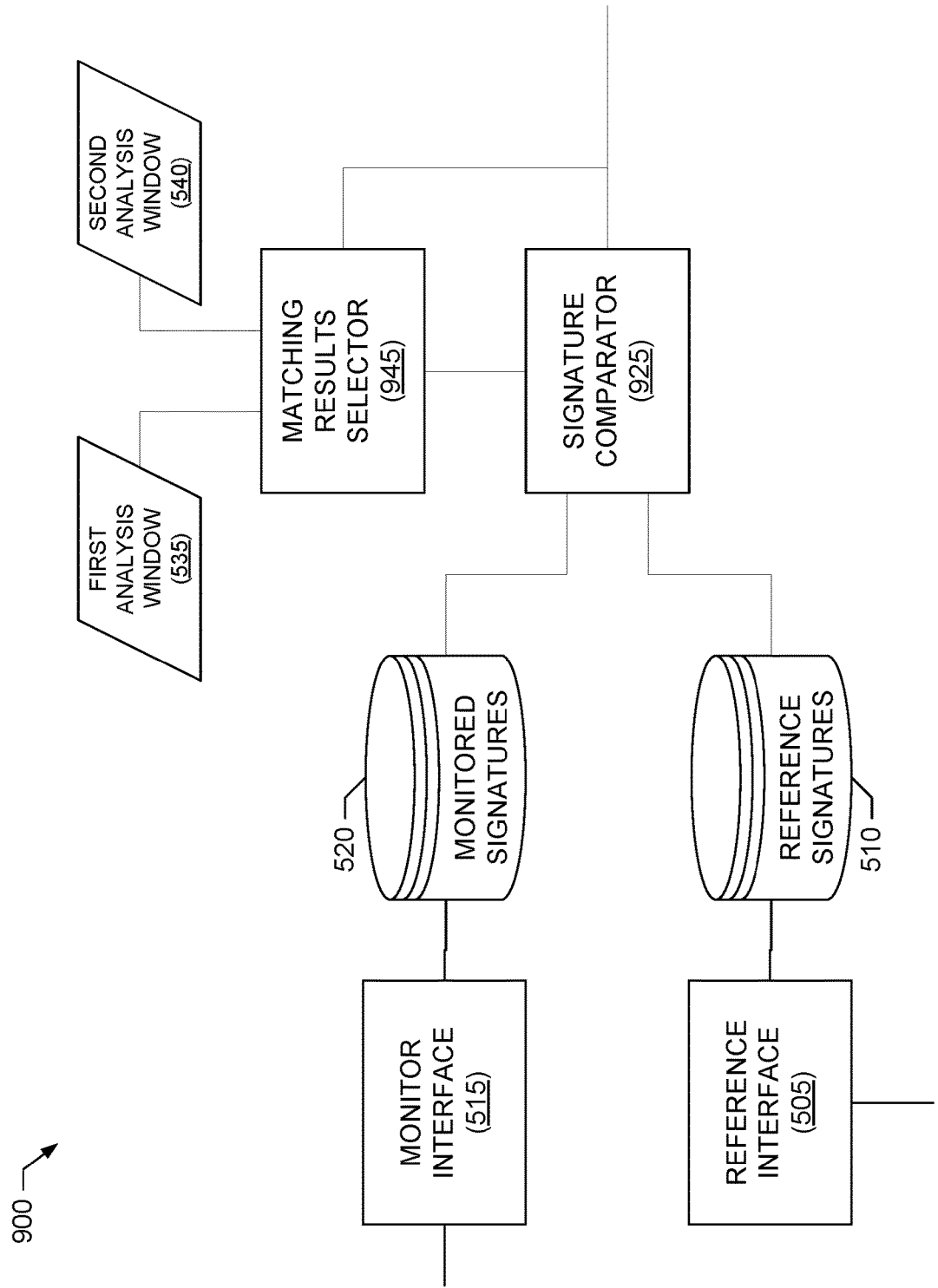
FIG. 9 is a block diagram of a second example implementation of an example crediting facility that may be included in the example media monitoring system of FIG. 1.

A block diagram of a second example implementation of the crediting facility 120 of FIG. 1 is illustrated in FIG. 9. The block diagram of FIG. 9 illustrates structures associated with implementing signature matching at the crediting facility 120. Other structures implemented by the crediting facility 120 have been omitted for clarity. Furthermore, the second example implementation of the crediting facility 120 of FIG. 9 includes many elements in common with the first example implementation illustrated in FIG. 5. Such like elements include the example reference interface 505, the example reference signature storage 510, the example monitor interface 515, the example monitored signature storage 520, the first example analysis window 535, and the second example analysis window 540, which are labeled with the same reference numerals in FIGS. 5 and 9. The detailed descriptions of these like elements are provided above in connection with the discussion of FIG. 5 and, in the interest of brevity, are not repeated in the discussion of FIG. 9.

However, unlike the first example implementation of the crediting facility 120 is illustrated in FIG. 5, which includes two example signature comparators 525 and 530 operating in parallel, the second example implementation of the crediting facility 120 illustrated in FIG. 9 includes one example media signature comparator 925, which can be selectively configured with either of the two example analysis windows 535 and 540. Like the example signature comparators 525 and 530, the example signature comparator 925 performs a signature matching procedure to compare a sequence of monitored signatures from the monitored signature storage 520 with different sequences of reference signatures from the reference signature storage 510, which are representative of different possible reference media sources. For example, such a signature matching procedure may evaluate one or more comparison criteria, such as a cross-correlation value, a Hamming distance, population (POP) count, etc., to determine whether a group, or neighborhood, of monitored signatures matches a particular group, or neighborhood, of reference signatures representative of a particular reference media source.

Furthermore, the second example implementation of the crediting facility 120 illustrated in FIG. 9 includes an example matching results selector 945 to select whether to configure the example signature comparator 925 to perform its signature matching procedure using the first (e.g., short) analysis window 535 or the second (e.g., long) analysis window 540. For example, the matching results selector 945 may initially configure the example signature comparator 925 to use the first (e.g., short) analysis window 535, and then evaluate the matching results output by the signature comparator 925 to determine, as described above for the matching results selector 545, whether the results are indicative of a matching uncertainty condition. If the matching results are indicative of a matching uncertainty condition, the example matching results selector 945 configures the example signature comparator 925 to use the second (e.g., long) analysis window 540. In some examples, after configuring the signature comparator 925 to use the second (e.g., long) analysis window 540, the matching results selector 945 periodically or aperiodically (e.g., according to some testing schedule) configures the example signature comparator 925 to use the first (e.g., short) analysis window 535 to determine whether the first window no longer exhibits the matching uncertainty condition(s). If the matching uncertainty condition(s) are no longer detected, the matching results selector 945 continues to cause the example signature comparator 925 to use the first (e.g., short) analysis window 535. However, if the matching uncertainty condition(s) are detected, the matching results selector 945 switches back to configuring the signature comparator 925 to use the second (e.g., long) analysis window 540. Such an implementation avoids the additional processing costs associated with operating multiple signature comparators in parallel, but adds potential latency to switching between using the first (e.g., short) analysis window 535 vs. the second (e.g., long) analysis window 540 to perform signature matching.

While example manners of implementing the example media monitoring system 100 are illustrated in FIGS. 1-9, one or more of the elements, processes and/or devices illustrated in FIGS. 1-9 may be combined, divided, rearranged, omitted, eliminated and/or implemented in any other way. Further, the example site monitor(s) 105, the example distribution media 115, the example crediting facility 120, the example reporting medium 125, the example reference identification system 130, the example reporting medium 135, the example device meter 210, the example people meter 215, the example media receiver(s) 305, the example signature generators 310, the example time determiner(s) 315, the example data reporter 320, the example reference interface 505, the example reference signature storage 510, the example monitor interface 515, the example monitored signature storage 520, the first example signature comparator 525, the second example signature comparator 530, the first example analysis window 535, the second example analysis window 540, the example matching results selector 545, the example signature comparator 925, the example matching results selector 945 and/or, more generally, the example media monitoring system 100 of FIGS. 1-9 may be implemented by hardware, software, firmware and/or any combination of hardware, software and/or firmware. Thus, for example, any of the example site monitor(s) 105, the example distribution media 115, the example crediting facility 120, the example reporting medium 125, the example reference identification system 130, the example reporting medium 135, the example device meter 210, the example people meter 215, the example media receiver(s) 305, the example signature generators 310, the example time determiner(s) 315, the example data reporter 320, the example reference interface 505, the example reference signature storage 510, the example monitor interface 515, the example monitored signature storage 520, the first example signature comparator 525, the second example signature comparator 530, the first example analysis window 535, the second example analysis window 540, the example matching results selector 545, the example signature comparator 925, the example matching results selector 945 and/or, more generally, the example media monitoring system 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example media monitoring system 100, the example site monitor(s) 105, the example distribution media 115, the example crediting facility 120, the example reporting medium 125, the example reference identification system 130, the example reporting medium 135, the example device meter 210, the example people meter 215, the example media receiver(s) 305, the example signature generators 310, the example time determiner(s) 315, the example data reporter 320, the example reference interface 505, the example reference signature storage 510, the example monitor interface 515, the example monitored signature storage 520, the first example signature comparator 525, the second example signature comparator 530, the first example analysis window 535, the second example analysis window 540, the example matching results selector 545, the example signature comparator 925 and/or the example matching results selector 945 is/are hereby expressly defined to include a tangible computer readable storage device or storage disk such as a memory, a digital versatile disk (DVD), a compact disk (CD), a Blu-ray disk, etc. storing the software and/or firmware. Further still, the example media monitoring system 100 may include one or more elements, processes and/or devices in addition to, or instead of, those illustrated in FIGS. 1-9, and/or may include more than one of any or all of the illustrated elements, processes and devices.

Figure 10:
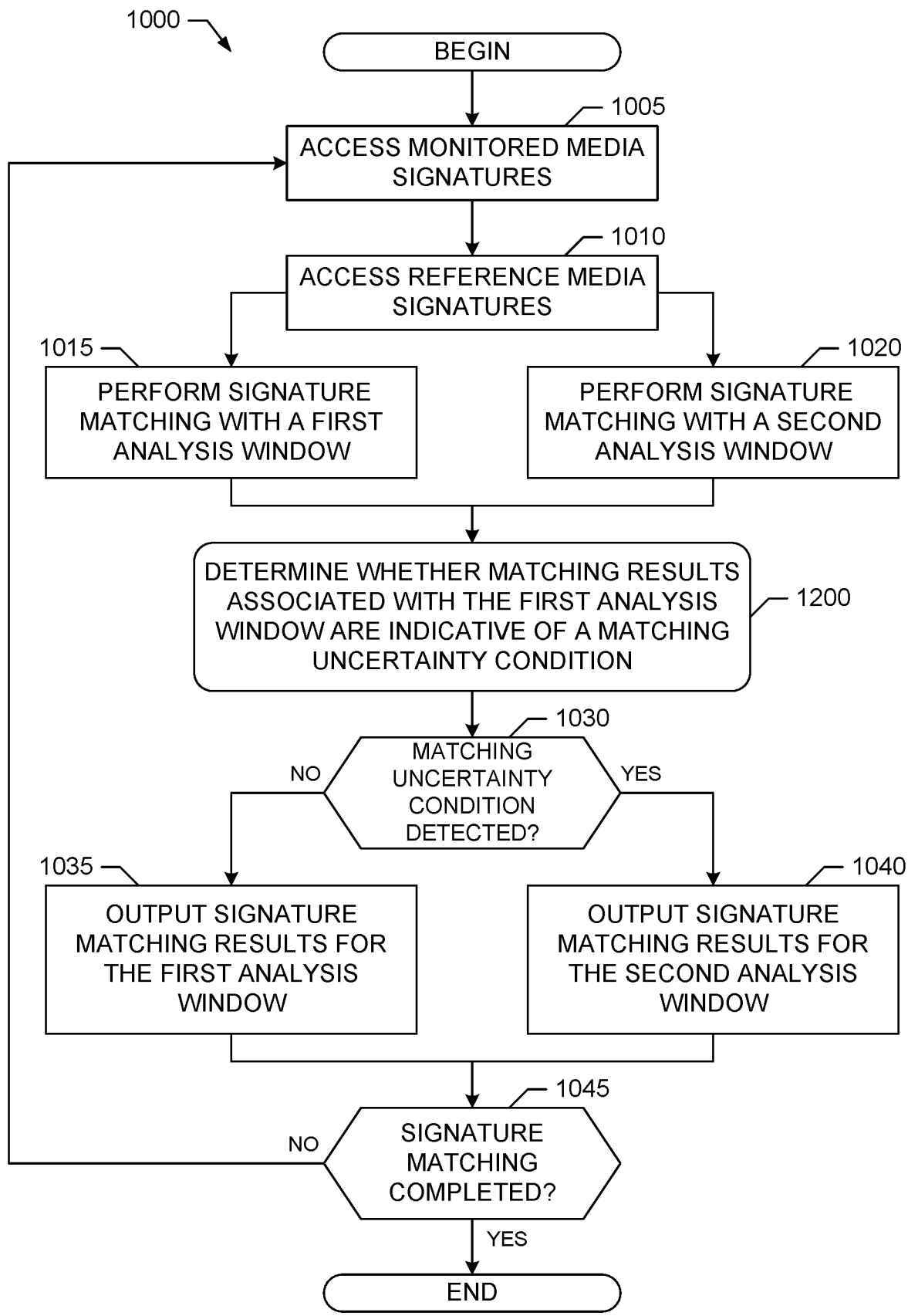
FIG. 10 is a flowchart representative of example machine readable instructions that may be executed to implement the first example crediting facility of FIG. 5.
Figure 11:
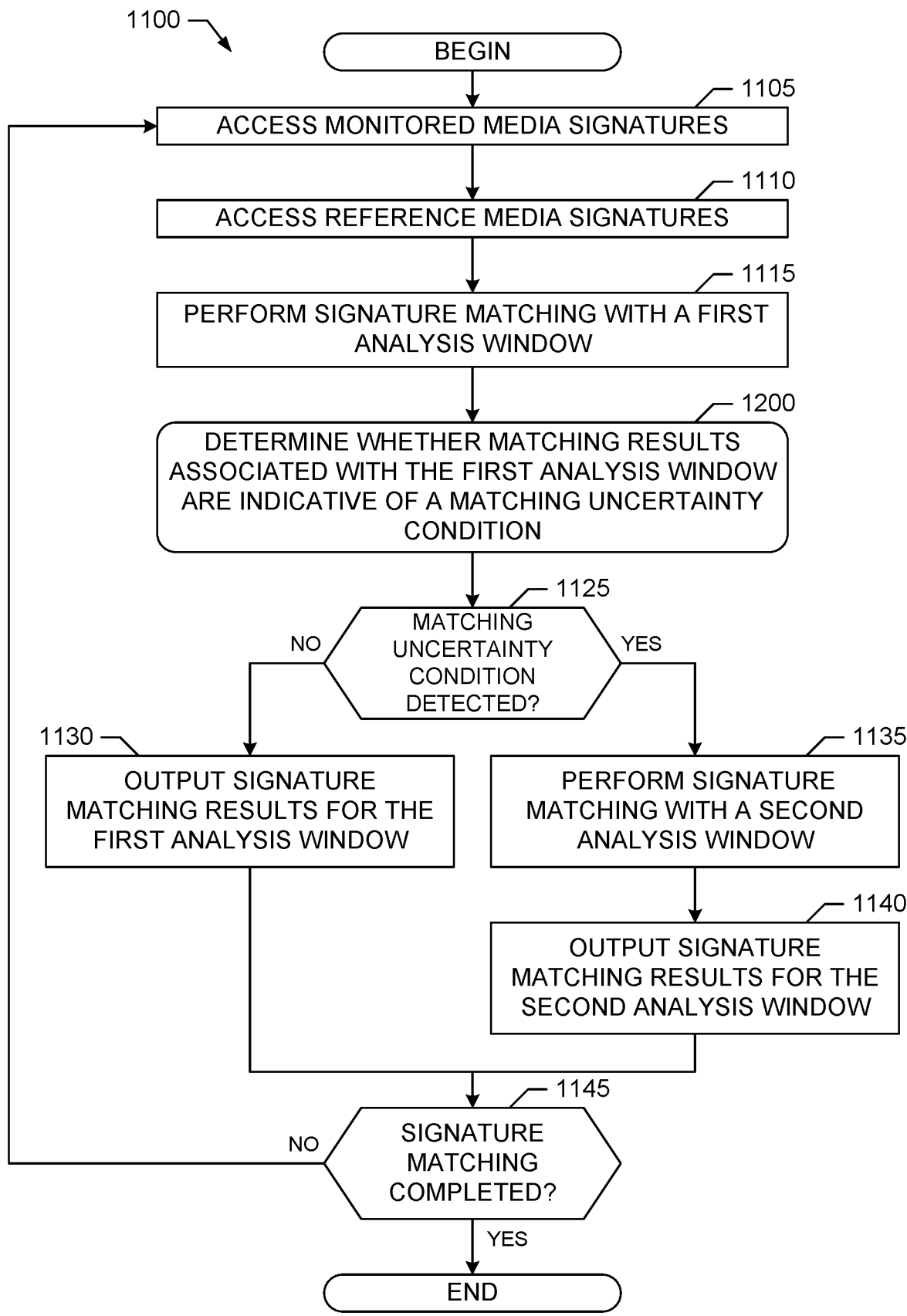
FIG. 11 is a flowchart representative of example machine readable instructions that may be executed to implement the second example crediting facility of FIG. 9.
Figure 12:
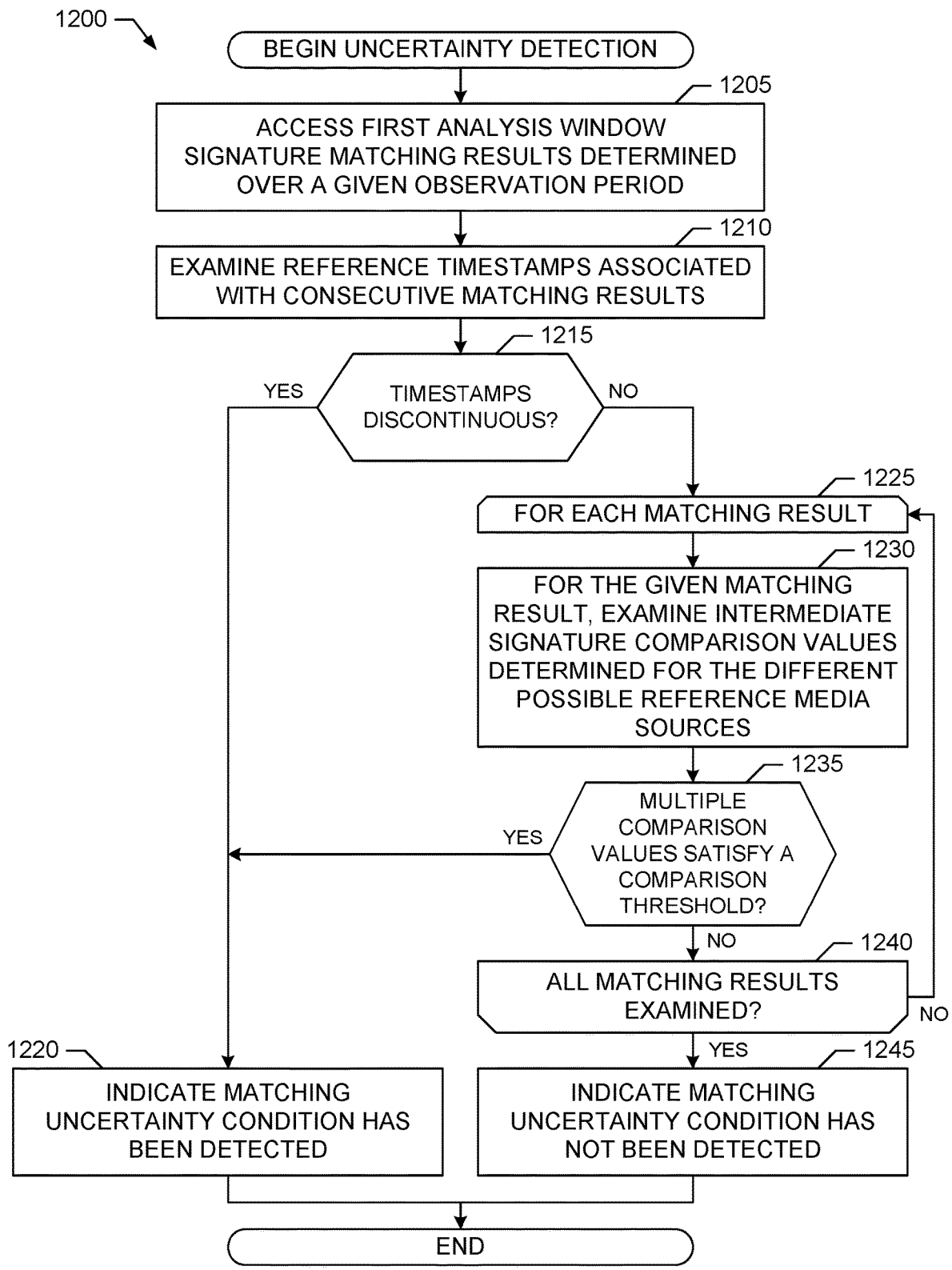
FIG. 12 is a flowchart representative of example machine readable instructions that may be executed to implement uncertainty detection processing for the first example crediting facility of FIG. 5 and/or the second example crediting facility of FIG. 9.

Flowcharts representative of example machine readable instructions for implementing the example media monitoring system 100, the example site monitor(s) 105, the example distribution media 115, the example crediting facility 120, the example reporting medium 125, the example reference identification system 130, the example reporting medium 135, the example device meter 210, the example people meter 215, the example media receiver(s) 305, the example signature generators 310, the example time determiner(s) 315, the example data reporter 320, the example reference interface 505, the example reference signature storage 510, the example monitor interface 515, the example monitored signature storage 520, the first example signature comparator 525, the second example signature comparator 530, the first example analysis window 535, the second example analysis window 540, the example matching results selector 545, the example signature comparator 925 and/or the example matching results selector 945 are shown in FIGS. 10-12. In these examples, the machine readable instructions comprise one or more programs for execution by a processor, such as the processors 1312 and/or 1412 shown in the example processor platform 1300 and 1400 discussed below in connection with FIGS. 13 and 14. The one or more programs, or portion(s) thereof, may be embodied in software stored on a tangible computer readable storage medium such as a CD-ROM, a floppy disk, a hard drive, a digital versatile disk (DVD), a Blu-Ray Disk™, or a memory associated with the processors 1312 and/or 1412, but the entire program or programs and/or portions thereof could alternatively be executed by a device other than the processors 1312 and/or 1412, and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 10-12, many other methods of implementing the example media monitoring system 100, the example site monitor(s) 105, the example distribution media 115, the example crediting facility 120, the example reporting medium 125, the example reference identification system 130, the example reporting medium 135, the example device meter 210, the example people meter 215, the example media receiver(s) 305, the example signature generators 310, the example time determiner(s) 315, the example data reporter 320, the example reference interface 505, the example reference signature storage 510, the example monitor interface 515, the example monitored signature storage 520, the first example signature comparator 525, the second example signature comparator 530, the first example analysis window 535, the second example analysis window 540, the example matching results selector 545, the example signature comparator 925 and/or the example matching results selector 945 may alternatively be used. For example, with reference to the flowcharts illustrated in FIGS. 10-12, the order of execution of the blocks may be changed, and/or some of the blocks described may be changed, eliminated, combined and/or subdivided into multiple blocks.

As mentioned above, the example processes of FIGS. 10-12 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 10-12 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the terms "comprising" and "including" are open ended. Also, as used herein, the terms "computer readable" and "machine readable" are considered equivalent unless indicated otherwise.

An example program 1000 that may be executed to implement the example crediting facility 120 of FIGS. 1 and/or 5 is represented by the flowchart shown in FIG. 10. For convenience, and without loss of generality, execution of the example program 1000 is described from the perspective of the example crediting facility 120 of FIG. 5 operating in the example media monitoring system 100 of FIG. 1. With reference to the preceding figures and associated written descriptions, the example program 1000 of FIG. 10 begins execution at block 1005 at which the first and second example signature comparators 525 and 530 of the crediting facility 120 access, from the example monitored signature storage 520, a sequence of monitored media signatures to be processed. At block 1010, the first and second signature comparators 525 and 530 access, from the example reference signature storage 510, sequences of reference media signatures to be compared with the sequence of monitored media signatures accessed at block 1005. As described above, the sequences of reference media signatures accessed at block 1010 are representative of respective different reference media sources, one of which the crediting facility 120 will attempt to identify as the source of the monitored media represented by the sequence of monitored media signatures.

At block 1015, the first signature comparator 525 performs, as described above, a signature matching procedure configured with the first (e.g., short) example analysis window 535 on the sequence of monitored media signatures accessed at block 1005 to compare those monitored signatures with the respective sequences of reference media signatures accessed at block 1010. As described above, the first (e.g., short) analysis window 535 defines the sizes (e.g., in time, in number of signatures, etc.) of the neighborhood of the sequence of monitored media signatures to be compared by the first signature comparator 525 with neighborhoods of the respective ones of the reference media sequences to determine respective signature matching results corresponding to each comparison instant of time (e.g., corresponding to the time resolution of the matching results, such a matching result being determined for each monitored signature packet, as described above). In parallel, at block 1020, the second signature comparator 530 performs, as described above, a signature matching procedure configured with the second (e.g., long) example analysis window 540 on the sequence of monitored media signatures accessed at block 1005 to compare those monitored signatures with the respective sequences of reference media signatures accessed at block 1010. As described above, the second (e.g., long) analysis window 540 defines the sizes (e.g., in time, in number of signatures, etc.) of the neighborhood of the sequence of monitored media signatures to be compared by the second signature comparator 530 with neighborhoods of the respective ones of the reference media sequences to determine respective signature matching results corresponding to each comparison instant of time (e.g., corresponding to the time resolution of the matching results, such a matching result being determined for each monitored signature packet, as described above).

At block 1200, the example matching results selector 545 of the crediting facility determines, as described above, whether the first matching results output by the first signature comparator 525 at block 1015, which correspond to performing the signature matching procedure with the first (e.g., short) analysis window 535, are indicative of a matching uncertainty condition. Example machine readable instructions capable of implementing the processing at block 1200 are illustrated in FIG. 12, which is described in further detail below. If the matching results selector 545 does not detect a matching uncertainty condition when evaluating the first matching results corresponding to the first (e.g., short) analysis window 535 (block 1030), processing proceeds to block 1035 at which the matching results selector 545 selects to cause the crediting facility 120 to output the first matching results determined at block 1015 by the first signature comparator 525 performing the signature matching procedure with the first (e.g., short) analysis window 535. However, if the matching results selector 545 does detect a matching uncertainty condition when evaluating the first matching results corresponding to the first (e.g., short) analysis window 535 (block 1030), processing proceeds to block 1040 at which the matching results selector 545 selects to cause the crediting facility 120 to output the second matching results determined at block 1020 by the second signature comparator 525 performing the signature matching procedure with the second (e.g., long) analysis window 540.

At block 1045, the crediting facility 120 determines whether processing of the sequence of monitored media signatures accessed at block 1005 is complete. If signature processing is not complete (block 1045), processing returns to block 1005 and blocks subsequent thereto to enable the crediting facility 120 to continue to performing media monitoring by processing the monitored media signatures. Otherwise, execution of the example program 1000 ends.

An example program 1100 that may be executed to implement the example crediting facility 120 of FIGS. 1 and/or 9 is represented by the flowchart shown in FIG. 11. For convenience, and without loss of generality, execution of the example program 1100 is described from the perspective of the example crediting facility 120 of FIG. 9 operating in the example media monitoring system 100 of FIG. 1. With reference to the preceding figures and associated written descriptions, the example program 1100 of FIG. 11 begins execution at block 1105 at which the example signature comparator 925 of the crediting facility 120 accesses, from the example monitored signature storage 520, a sequence of monitored media signatures to be processed. At block 1110, the example signature comparator 925 accesses, from the example reference signature storage 510, sequences of reference media signatures to be compared with the sequence of monitored media signatures accessed at block 1105. As described above, the sequences of reference media signatures accessed at block 1110 are representative of respective different reference media sources, one of which the crediting facility 120 will attempt to identify as the source of the monitored media represented by the sequence of monitored media signatures.

At block 1115, the example matching results selector 945 of the crediting facility 120 configures the signature comparator 925 to perform, as described above, a signature matching procedure with the first (e.g., short) example analysis window 535 on the sequence of monitored media signatures accessed at block 1105 to compare those monitored signatures with the respective sequences of reference media signatures accessed at block 1110. As described above, the first (e.g., short) analysis window 535 defines the sizes (e.g., in time, in number of signatures, etc.) of the neighborhood of the sequence of monitored media signatures to be compared by the first signature comparator 525 with neighborhoods of the respective ones of the reference media sequences to determine respective signature matching results corresponding to each comparison instant of time (e.g., corresponding to the time resolution of the matching results, such a matching result being determined for each monitored signature packet, as described above).

At block 1200, the matching results selector 945 determines, as described above, whether the first matching results output by the signature comparator 925 at block 1115, which correspond to performing the signature matching procedure with the first (e.g., short) analysis window 535, are indicative of a matching uncertainty condition. Example machine readable instructions capable of implementing the processing at block 1200 are illustrated in FIG. 12, which is described in further detail below. If the matching results selector 945 does not detect a matching uncertainty condition when evaluating the first matching results corresponding to the first (e.g., short) analysis window 535 (block 1125), processing proceeds to block 1130 at which the matching results selector 545 continues to permit the first signature comparator 525 to perform the signature matching procedure with the first (e.g., short) analysis window 535, which causes the crediting facility 120 to output the first matching results corresponding to the first (e.g., short) analysis window 535.

However, if the matching results selector 945 does detect a matching uncertainty condition when evaluating the first matching results corresponding to the first (e.g., short) analysis window 535 (block 1125), processing proceeds to block 1135 at which the matching results selector 545 configures the signature comparator 925 to perform, as described above, the signature matching procedure with the second (e.g., long) example analysis window 540 on the sequence of monitored media signatures accessed at block 1105 to compare those monitored signatures with the respective sequences of reference media signatures accessed at block 1110. At block 1140, the crediting facility 120 outputs the second matching results determined at block 1135 by the signature comparator 925 performing the signature matching procedure with the second (e.g., long) analysis window 540.

At block 1145, the crediting facility 120 determines whether processing of the sequence of monitored media signatures accessed at block 1105 is complete. If signature processing is not complete (block 1145), processing returns to block 1105 and blocks subsequent thereto to enable the crediting facility 120 to continue to performing media monitoring by processing the monitored media signatures. Otherwise, execution of the example program 1100 ends.

An example program 1200 capable of performing matching uncertainty detection processing at blocks 1200 of FIGS. 10 and/or 11 is illustrated in FIG. 12. The example program 1200 of FIG. 12 is capable of being executed by either the example matching results selector 545 of the crediting facility 120 of FIG. 5, or the example matching results selector 945 of the crediting facility 120 of FIG. 9. Thus, for convenience, the program 1200 is described as being executed by the matching results selector 545/945 to indicate that the program can be executed by either the matching results selector 545 or the matching results selector 945.

Turning to FIG. 12, execution of the example program 1200 begins at block 1205 at which the matching results selector 545/945 accesses first signature matching results determined with the first (e.g., short) analysis window 535 (e.g., by the first signature comparator 525 or the signature comparator 925). At block 1210, the matching results selector 545/945 examines the reference timestamps associated with consecutive ones of the first matching results within an observation time period. As described above, at block 1215, the matching results selector 545/945 determines whether any one or more of the consecutive timestamps are discontinuous (e.g., whether one or more of the reference timestamps do not increment relative to preceding ones of the reference timestamps by a first amount within a range based on a time resolution associated with the examined matching results).

If the matching results selector 545/945 detects discontinuity in the consecutive timestamps (block 1215), processing proceeds to block 1220 at which the matching results selector 545/945 indicates a matching uncertainty condition has been detected. In some examples, if the matching results selector 545/945 does not detect discontinuity in the consecutive timestamps (block 1215), processing proceeds to block 1225 at which the matching results selector 545/945 examines the intermediate signature comparison decisions made for each of the signature matching results. For example, at block 1230, for a given signature matching result, the matching results selector 545/945 examines, as described above, the intermediate signature comparison values determined when comparing the given neighborhood of monitored media signatures to the neighborhoods of respective reference media signatures representative of the different reference media sources. If the matching results selector 545/945 determines that multiple intermediate signature comparison values satisfy a comparison threshold, processing proceeds to block 1220 at which the matching results selector 545/945 indicates a matching uncertainty condition has been detected. Otherwise, processing proceeds to block 1240 at which the matching results selector 545/945 continues to examine the intermediate signature comparison decisions made for each of the signature matching results. If after examining the intermediate signature comparison decisions made for each of the signature matching results the matching results selector 545/945 determines that none of the results had multiple intermediate signature comparison decisions that satisfied the comparison threshold, processing proceeds to block 1245 at which the matching results selector 545/945 indicates a matching uncertainty condition has not been detected. Execution of the example program 1200 then ends.

Figure 13:
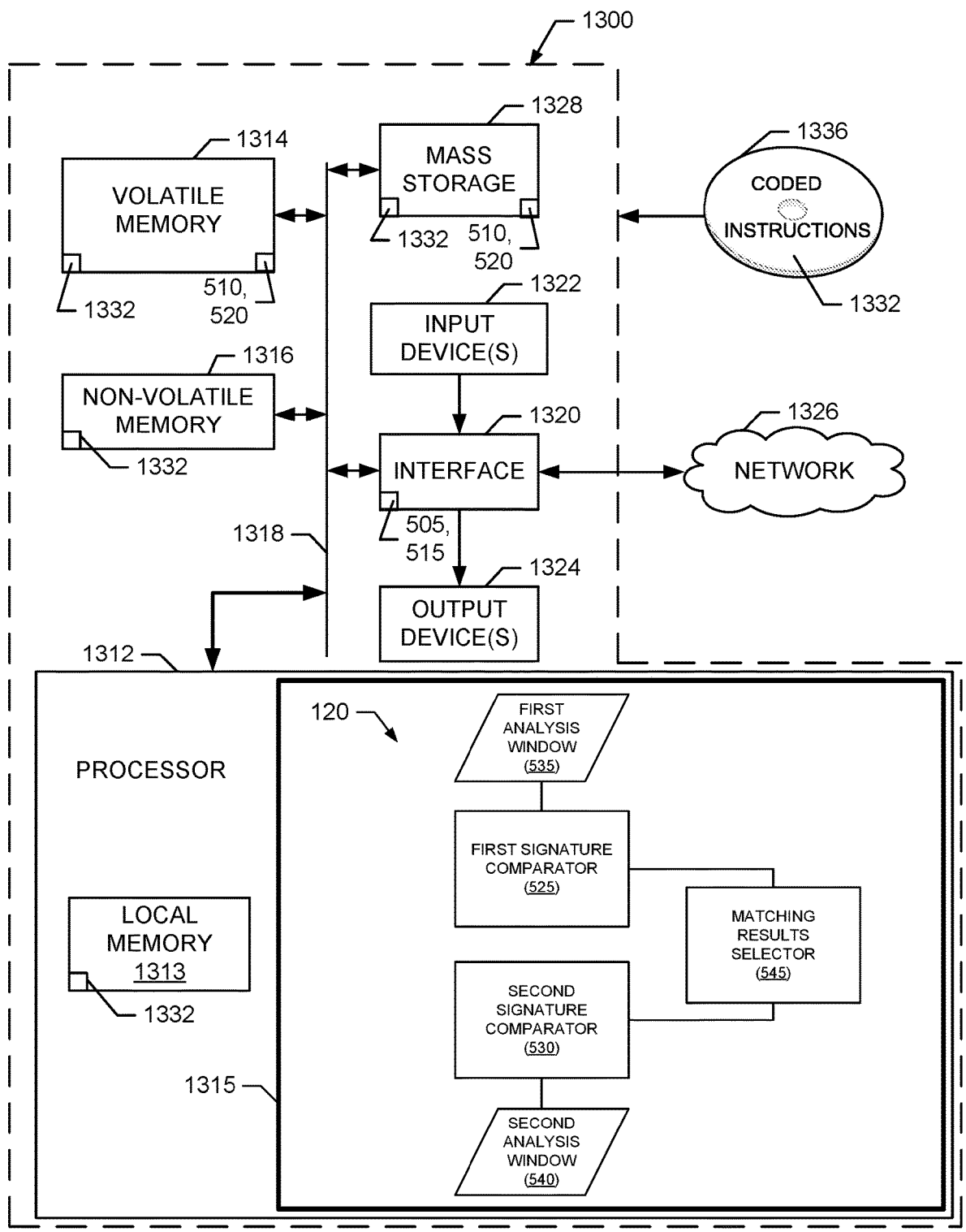
FIG. 13 is a block diagram of an example processor platform structured to execute the example machine readable instructions of FIGS. 10 and/or 12 to implement the first example crediting facility of FIG. 5.

FIG. 13 is a block diagram of an example processor platform 1300 capable of executing the instructions of FIGS. 10 and/or 12 to implement the example crediting facility 120 of FIG. 5. The processor platform 1300 can be, for example, a server, a personal computer, a mobile device (e.g., a cell phone, a smart phone, a tablet such as an iPad™), a personal digital assistant (PDA), an Internet appliance, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer. In the illustrated example of FIG. 13, the processor 1312 includes one or more example processing cores 1315 configured via example instructions 1332, which include the example instructions of FIGS. 10 and/or 12, to implement the first example signature comparator 525, the second example signature comparator 530, the first example analysis window 535, the second example analysis window 540 and/or the example matching results selector 545 of FIG. 5.

The processor 1312 of the illustrated example includes a local memory 1313 (e.g., a cache). The processor 1312 of the illustrated example is in communication with a main memory including a volatile memory 1314 and a non-volatile memory 1316 via a link 1318. The link 1318 may be implemented by a bus, one or more point-to-point connections, etc., or a combination thereof. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1300, can allow the user to control the computer system and provide data to the computer using physical gestures, such as, but not limited to, hand or body movements, facial expressions, and face recognition.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.). In the illustrated example of FIG. 13, the interface circuit 1320 is also structured to implement the example reference interface 505 and/or the example monitor interface 515 of FIG. 5.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID (redundant array of independent disks) systems, and digital versatile disk (DVD) drives. In some examples, the mass storage device 1328 may implement the example reference signature storage 510 and/or the example monitored signature storage 520 of FIG. 5. Additionally or alternatively, in some examples the volatile memory 1314 may implement the example reference signature storage 510 and/or the example monitored signature storage 520 of FIG. 5.

Coded instructions 1332 corresponding to the instructions of FIGS. 10 and/or 12 may be stored in the mass storage device 1328, in the volatile memory 1314, in the non-volatile memory 1316, in the local memory 1313 and/or on a removable tangible computer readable storage medium, such as a CD or DVD 1336.

Figure 14:
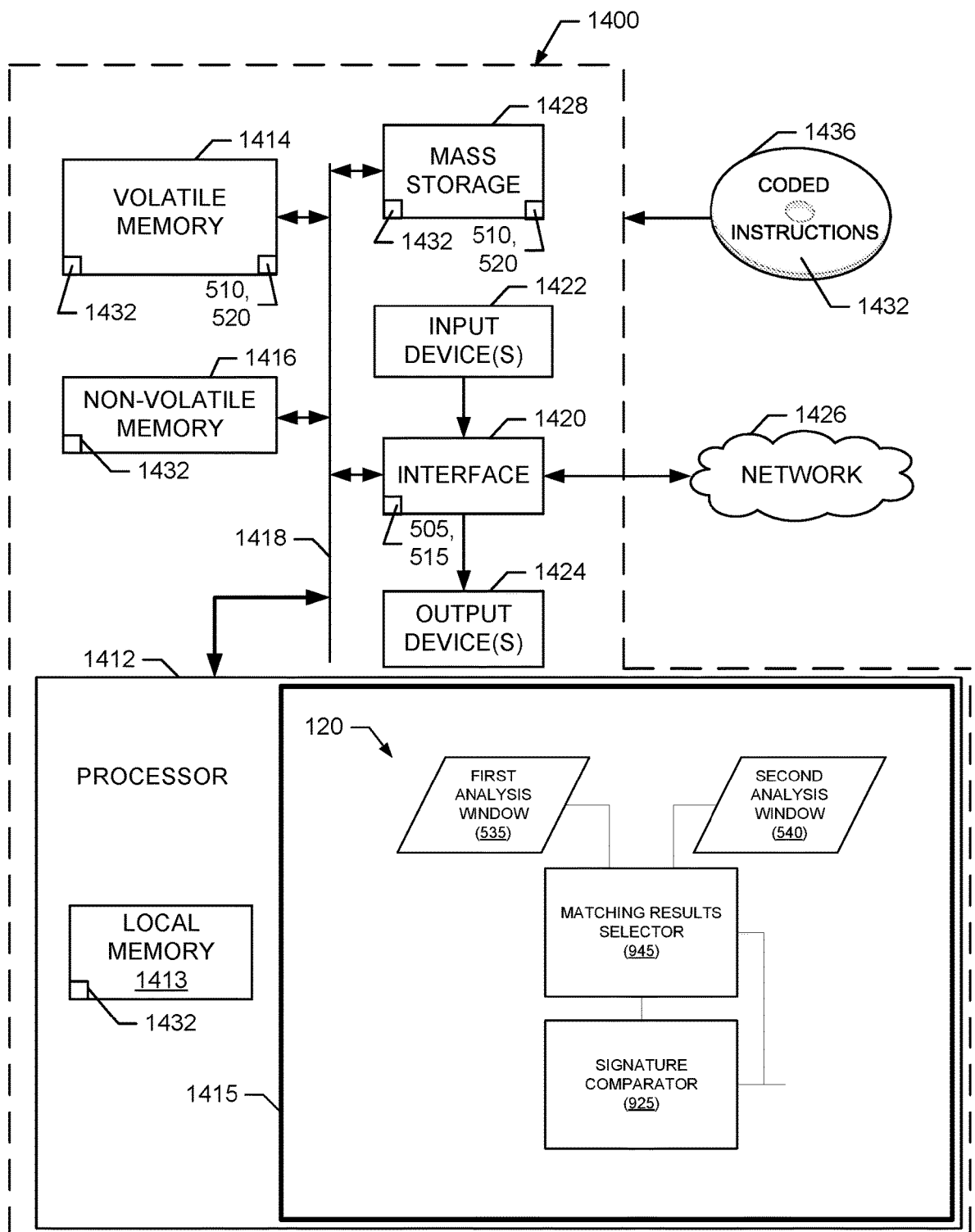
FIG. 14 is a block diagram of an example processor platform structured to execute the example machine readable instructions of FIGS. 11 and/or 12 to implement the second example crediting facility of FIG. 9.

FIG. 14 is a block diagram of an example processor platform 1400 capable of executing the instructions of FIGS. 11 and/or 12 to implement the example crediting facility 120 of FIG. 9. The processor platform 1400 can be, for example, a server, a personal computer, a mobile device (e.g., a cell phone, a smart phone, a tablet such as an iPad™), a personal digital assistant (PDA), an Internet appliance, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors or controllers from any desired family or manufacturer. In the illustrated example of FIG. 14, the processor 1412 includes one or more example processing cores 1415 configured via example instructions 1432, which include the example instructions of FIGS. 11 and/or 12, to implement the example signature comparator 925, the first example analysis window 535, the second example analysis window 540 and/or the example matching results selector 945 of FIG. 9.

The processor 1412 of the illustrated example includes a local memory 1413 (e.g., a cache). The processor 1412 of the illustrated example is in communication with a main memory including a volatile memory 1414 and a non-volatile memory 1416 via a link 1418. The link 1418 may be implemented by a bus, one or more point-to-point connections, etc., or a combination thereof. The volatile memory 1414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), and/or a PCI express interface.

In the illustrated example, one or more input devices 1422 are connected to the interface circuit 1420. The input device(s) 1422 permit(s) a user to enter data and commands into the processor 1412. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1300, can allow the user to control the computer system and provide data to the computer using physical gestures, such as, but not limited to, hand or body movements, facial expressions, and face recognition.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1420 of the illustrated example, thus, typically includes a graphics driver card, a graphics driver chip or a graphics driver processor.

The interface circuit 1420 of the illustrated example also includes a communication device such as a transmitter, a receiver, a transceiver, a modem and/or network interface card to facilitate exchange of data with external machines (e.g., computing devices of any kind) via a network 1426 (e.g., an Ethernet connection, a digital subscriber line (DSL), a telephone line, coaxial cable, a cellular telephone system, etc.). In the illustrated example of FIG. 14, the interface circuit 1420 is also structured to implement the example reference interface 505 and/or the example monitor interface 515 of FIG. 9.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, RAID (redundant array of independent disks) systems, and digital versatile disk (DVD) drives. In some examples, the mass storage device 1428 may implement the example reference signature storage 510 and/or the example monitored signature storage 520 of FIG. 9. Additionally or alternatively, in some examples the volatile memory 1414 may implement the example reference signature storage 510 and/or the example monitored signature storage 520 of FIG. 9.

Coded instructions 1432 corresponding to the instructions of FIGS. 11 and/or 12 may be stored in the mass storage device 1428, in the volatile memory 1414, in the non-volatile memory 1416, in the local memory 1413 and/or on a removable tangible computer readable storage medium, such as a CD or DVD 1436.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system for performing signature comparison, the system comprising:
    a processor; and
    a memory storing instructions that, when executed by the processor, cause the system to perform operations comprising:
        comparing first groups of monitored signatures from a sequence of monitored signatures representative of media presented by a media device with second groups of reference signatures from respective sequences of reference signatures representative of corresponding different reference media to determine a first sequence of signature match results for an observation period, the first groups and the second groups to have a first size corresponding to a first number of signatures;
        detecting a discontinuity in the first sequence of signature match results; and
        in response to the discontinuity, comparing third groups of monitored signatures from the sequence of monitored signatures with fourth groups of reference signatures from the respective sequences of reference signatures to determine a second sequence of signature match results for the observation period, the third groups and the fourth groups to have a second size corresponding to a second number of signatures greater than the first number of signatures,
        wherein the first sequence of signature match results includes a first signature match result and a preceding second signature match result, the first signature match result includes a first timestamp, the second signature match result includes a second timestamp, and
        wherein detecting the discontinuity in the first sequence of signature match results comprises:
            detecting the discontinuity when the first timestamp does not increment relative to the second timestamp by an amount within a range, the range based on a time resolution.

2. The system of claim 1, wherein the sequence of monitored signatures includes a plurality of packets of monitored signatures reported by a device meter, the device meter to generate the plurality of packets of monitored signatures from the media presented by the media device, the time resolution based on a media duration represented by one packet of the plurality of packets of monitored signatures.

3. The system of claim 2, wherein the time resolution is further based on a number of monitored signatures included in the one packet of the plurality of packets of monitored signatures and a media duration represented by each monitored signature included in the one packet of monitored signatures.

4. The system of claim 1, wherein is the operations further comprise:
    outputting the second sequence of signature match results.

5. The system of claim 1, wherein the operations further comprise:
    identifying the media presented by the media device based on the second sequence of signature match results.

6. The system of claim 1, wherein the operations further comprise:
    combining media identification information determined based on the second sequence of signature match results with audience identification information to form audience measurement data characterizing the media presented by the media device.

7. A non-transitory computer readable storage medium having stored thereon instructions that, upon execution by a processor, cause performance of a set of operations comprising:
    comparing first groups of monitored signatures from a sequence of monitored signatures representative of media presented by a media device with second groups of reference signatures from respective sequences of reference signatures representative of corresponding different reference media to determine a first sequence of signature match results for an observation period, the first groups and the second groups to have a first size corresponding to a first number of signatures;
    detecting a discontinuity in the first sequence of signature match results; and
    in response to the discontinuity, comparing third groups of monitored signatures from the sequence of monitored signatures with fourth groups of reference signatures from the respective sequences of reference signatures to determine a second sequence of signature match results for the observation period, the third groups and the fourth groups to have a second size corresponding to a second number of signatures greater than the first number of signatures,
    wherein the first sequence of signature match results includes a first signature match result and a preceding second signature match result, the first signature match result includes a first timestamp, the second signature match result includes a second timestamp, and
    wherein detecting the discontinuity in the first sequence of signature match results comprises:
        detecting the discontinuity when the first timestamp does not increment relative to the second timestamp by an amount within a range, the range based on a time resolution.

8. The non-transitory computer readable storage medium of claim 7, wherein the sequence of monitored signatures includes a plurality of packets of monitored signatures reported by a device meter, the device meter to generate the plurality of packets of monitored signatures from the media presented by the media device, the time resolution based on a media duration represented by one packet of the plurality of packets of monitored signatures.

9. The non-transitory computer readable storage medium of claim 8, wherein the time resolution is further based on a number of monitored signatures included in the one packet of the plurality of packets of monitored signatures and a media duration represented by each monitored signature included in the one packet of monitored signatures.

10. The non-transitory computer readable storage medium of claim 7, wherein the operations further comprise:
outputting the second sequence of signature match results.

11. The non-transitory computer readable storage medium of claim 7, wherein the operations further comprise:
identifying the media presented by the media device based on the second sequence of signature match results.

12. The non-transitory computer readable storage medium of claim 7, wherein the operations further comprise:
combining media identification information determined based on the second sequence of signature match results with audience identification information to form audience measurement data characterizing the media presented by the media device.

13. A method for performing signature comparison, the method comprising:
comparing, by executing a first instruction with a processor, first groups of monitored signatures from a sequence of monitored signatures representative of media presented by a media device with second groups of reference signatures from respective sequences of reference signatures representative of corresponding different reference media to determine a first sequence of signature match results for an observation period, the first groups and the second groups to have a first size corresponding to a first number of signatures;
detecting a discontinuity in the first sequence of signature match results; and
comparing, by executing a second instruction with the processor, and in response to the discontinuity, third groups of monitored signatures from the sequence of monitored signatures with fourth groups of reference signatures from the respective sequences of reference signatures to determine a second sequence of signature match results for the observation period, the third groups and the fourth groups to have a second size corresponding to a second number of signatures greater than the first number of signatures,
wherein the first sequence of signature match results includes a first signature match result and a preceding second signature match result, the first signature match result includes a first timestamp, the second signature match result includes a second timestamp, and
wherein detecting the discontinuity in the first sequence of signature match results comprises:
detecting the discontinuity when the first timestamp does not increment relative to the second timestamp by an amount within a range, the range based on a time resolution.

14. The method of claim 13, wherein the sequence of monitored signatures includes a plurality of packets of monitored signatures reported by a device meter, the device meter to generate the plurality of packets of monitored signatures from the media presented by the media device, the time resolution based on a media duration represented by one packet of the plurality of packets of monitored signatures.

15. The method of claim 14, wherein the time resolution is further based on a number of monitored signatures included in the one packet of the plurality of packets of monitored signatures and a media duration represented by each monitored signature included in the one packet of monitored signatures.

16. The method of claim 13, further including outputting the second sequence of signature match results.

17. The method of claim 13, further comprising:
identifying the media presented by the media device based on the second sequence of signature match results.

18. The method of claim 13, further comprising:
combining media identification information determined based on the second sequence of signature match results with audience identification information to form audience measurement data characterizing the media presented by the media device.

* * * * *